US012512593B2

(12) United States Patent
Dutta et al.

(10) Patent No.: US 12,512,593 B2
(45) Date of Patent: Dec. 30, 2025

(54) ANTENNA MODULE AS A RADIO-FREQUENCY (RF) INTEGRATED CIRCUIT (IC) DIE WITH AN INTEGRATED ANTENNA SUBSTRATE, AND RELATED FABRICATION METHODS

(71) Applicant: QUALCOMM Incorporated, San Diego, CA (US)

(72) Inventors: Ranadeep Dutta, Del Mar, CA (US); Jonghae Kim, San Diego, CA (US); Je-Hsiung Lan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 252 days.

(21) Appl. No.: 18/300,067

(22) Filed: Apr. 13, 2023

(65) Prior Publication Data

US 2024/0347913 A1 Oct. 17, 2024

(51) Int. Cl.
*H01Q 9/04* (2006.01)
*H01Q 1/22* (2006.01)

(52) U.S. Cl.
CPC ......... *H01Q 9/0407* (2013.01); *H01Q 1/2283* (2013.01)

(58) Field of Classification Search
CPC ............... H01Q 9/0407; H01Q 1/2283; H01Q 21/0075; H01Q 21/065; H01L 23/66; H01L 2223/6677
See application file for complete search history.

(56) References Cited

U.S. PATENT DOCUMENTS 6,384,785 B1 * 5/2002 Kamogawa .............. H01Q 1/38 343/700 MS
8,779,564 B1 7/2014 Knudsen et al.
(Continued)

FOREIGN PATENT DOCUMENTS

CN 1917285 A 2/2007
EP 3413347 B1 * 12/2023 ......... H01L 23/4824
TW 1819923 B * 10/2023

OTHER PUBLICATIONS

Gu, X. et al., "Packaging and Antenna Integration for Silicon-Based Millimeter-Wave Phased Arrays: 5G and Beyond," IEEE Journal of Microwaves, vol. 1, No. 1, Jan. 2021, pp. 123-134.
(Continued)

*Primary Examiner* — Seokjin Kim
(74) *Attorney, Agent, or Firm* — Withrow & Terranova PLLC

(57) ABSTRACT

An antenna module as a radio-frequency (RF) integrated circuit (IC) semiconductor die ("die") with an integrated antenna substrate. The die with the integrated antenna substrate can be provided as part of a single IC chip that is fabricated as part of a wafer-level fabrication process as an example. The antenna elements are formed in one more antenna layers as part of an antenna substrate. The antenna layers may be formed as re-distribution layers (RDLs) for example to support smaller line-spacing (LS) and/or smaller pitched metal interconnects for forming and interconnecting to smaller wavelength antenna elements for supporting higher frequency communications. The antenna substrate is formed on a semiconductor wafer of an IC as part of the die. In this manner, the antenna layers can be formed as part of a wafer-level fabrication process used to form the die to form the antenna layers.

38 Claims, 20 Drawing Sheets

(56) References Cited

U.S. PATENT DOCUMENTS

| | | | | |
|---|---|---|---|---|
| 11,417,605 | B2 * | 8/2022 | See | H01Q 1/243 |
| 2012/0280380 | A1 | 11/2012 | Kamgaing | |
| 2015/0340765 | A1 | 11/2015 | Dang et al. | |
| 2019/0067220 | A1 | 2/2019 | Wan et al. | |
| 2020/0335458 | A1 * | 10/2020 | Chen | H01Q 21/28 |
| 2020/0400815 | A1 * | 12/2020 | Wintermantel | G01S 13/931 |
| 2022/0037306 | A1 * | 2/2022 | You | H01L 24/24 |
| 2023/0144206 | A1 * | 5/2023 | Dogiamis | H01Q 1/526<br>257/774 |
| 2023/0290700 | A1 * | 9/2023 | Chiang | H01Q 15/0013 |
| 2023/0307817 | A1 * | 9/2023 | Hwang | H01Q 21/24 |

OTHER PUBLICATIONS

International Search Report and Written Opinion for International Patent Application No. PCT/US2024/021935, mailed Jun. 21, 2024, 14 pages.

* cited by examiner

ANTENNA MODULE AS A RADIO-FREQUENCY (RF) INTEGRATED CIRCUIT (IC) DIE WITH AN INTEGRATED ANTENNA SUBSTRATE, AND RELATED FABRICATION METHODS

BACKGROUND

I. Field of the Disclosure

The field of the disclosure relates to antenna modules, such as "antenna-in-packages" (AiP(s)), that include a radio-frequency (RF) integrated circuit (IC) coupled to an antenna(s) as part of an IC package.

II. Background

Modern smart phones and other portable devices have extended the use of different wireless links with a variety of technologies in different radio frequency bands. For example, fifth generation (5G) cellular networks, commonly referred to as 5G new radio (NR), include frequencies in the range of 24.25 to 86 GigaHertz (GHz), with the lower 19.25 GHZ (24.25-43.5 GHZ) more likely to be used for mobile devices. This frequency spectrum of 5G communications is in the range of millimeter wave (mmWave) or millimeter band. mmWave enables higher data rates than at lower frequencies, such as those used for Wi-Fi and current cellular networks. It may also be desired to provide for communication devices that support higher communications frequencies that are sub-mmWave for a sixth generation (6G) frequency spectrum, such as the D-band frequency spectrum in the frequency range of 110 GHz to 170 GHz, to utilize an additional available frequency spectrum.

Radio-frequency (RF) transceivers are incorporated into mobile and other portable devices that are designed to support communications signals in the desired frequency spectrum. To support the integration of a RF transceiver in a device, the RF transceiver can be integrated in a RF integrated circuit (IC) in a RF IC chip that is provided as part of an antenna module. The RF IC chip is realized in a RF IC semiconductor die ("RF IC die"). An antenna module may also be referred to as an "antenna-in-package" (AiP). A conventional antenna module includes a die module that includes one or more RF ICs, a power management IC (PMIC), and passive electrical components (e.g., inductors, capacitors, etc.) mounted to a package substrate as a support structure. The RF IC die includes a RF signal transmitter and receiver capable of modulating RF signals to be transmitted in a supported frequency band(s) and demodulating received RF signals in a supported frequency band(s). The package substrate includes a plurality of metallization layers (e.g., laminated FR2 metallization layers) that include metal lines/traces to metal interconnects for providing chip-to-chip and external signal interfaces to the die module. The package substrate also includes other metallization layers wherein one or more antennas are formed that are electrically coupled to the die module through the metal interconnects of the package substrate to be capable of receiving and radiating electrical RF signals as electromagnetic (EM) signals. The package substrate may include a plurality of antennas, also referred to an antenna array, to provide a signal coverage in a desired, larger area around the antenna module.

As the frequency spectrum supported by antenna modules increases, there is a need to design antennas in such antenna modules to be capable of supporting higher frequencies, such as D-band frequencies for example.

SUMMARY OF THE DISCLOSURE

Aspects disclosed herein include an antenna module as a radio-frequency (RF) integrated circuit (IC) semiconductor die ("die") with an integrated antenna substrate. The die with the integrated antenna substrate can be provided as part of a single IC chip that is fabricated as part of a wafer-level fabrication process as an example. Such related fabrication processes are also disclosed. The die includes a RF IC that includes a RF circuit (e.g., a front-end RF circuit) that includes RF signal transmission and/or reception capability. The RF IC is coupled to antenna elements in the antenna substrate as part of the die to receive and radiate such RF signals. It may be desired for an antenna module to support higher frequency communications that support shorter wavelengths (e.g., D-band frequencies). This may require smaller antenna elements that require fabrication processes that can form metal elements (e.g., metal traces, metal lines) in smaller line-space (L/S) metal patterns with metal interconnects at smaller pitches than may be possible in an antenna-in-package (AiP) for example. In an AiP, the antenna layers are formed in a separate package substrate that is separately fabricated and packaged with an IC die through coupled bump structures as part of an IC package. In this regard, in exemplary aspects, to be able to form smaller antenna elements in an antenna substrate that support higher frequencies with smaller L/S metal patterns and/or smaller pitch metal interconnects coupled to the antenna elements, the antenna elements are formed in one more antenna layers as part of an antenna substrate that is formed on a semiconductor wafer (e.g., a complementary metal oxide semiconductor (CMOS) wafer). The RF IC is formed in a semiconductor wafer as part of a die. In this manner, the antenna layers can be formed as part of a wafer-level fabrication process used to form the RF IC in the semiconductor wafer and to form the antenna layers in the same die with smaller L/S metal patterns and/or smaller pitch metal interconnects to support antenna elements capable of supporting higher frequency communications. Also, by providing an antenna module that integrates the antenna substrate in a die, the antenna module can be fully tested at the wafer level if desired, to improve quality and yield.

In one exemplary aspect, the antenna layers of the antenna substrate may be formed on the back side of the RF IC adjacent to (i.e., directly adjacent to or non-directly (i.e., indirectly) adjacent to) a back side of a semiconductor layer of the RF IC in which the active semiconductor devices are formed. In an example, the back side of the semiconductor layer is on the opposite side of a front side of the semiconductor layer that is adjacent to a BEOL metallization structure. The semiconductor layer can be formed as part of a front-end-of-line (FEOL) process. Forming the antenna substrate on the back side of the RF IC and adjacent to the back side of the semiconductor layer can locate the antenna elements of the antenna substrate closer to the IC metal layers to minimize distance therebetween, reducing transmission losses as a result. For example, the antenna substrate may be formed adjacent to a bulk semiconductor material layer (e.g., bulk silicon substrate) if the RF IC is a bulk device. Alternatively, as another example, the antenna substrate may be formed adjacent to a buried oxide (BOX) layer if the RF IC is a semiconductor-on-insulator (SOI) device. In these examples, the metal layers formed as part of a back-end-of-line (BEOL) interconnect structure of the RF IC for providing signal routing to the RF IC are formed on the opposite side of the semiconductor layer adjacent to the antenna substrate. In this example, the formation of the antenna layers of the antenna substrate on the back side of the RF IC allows the antenna layers to be built up on a handle coupled the semiconductor layer that will not interfere with the formation of the BEOL interconnect structure of the RF IC.

Also, by the antenna module being provided as a die that includes the integrated antenna substrate, the distance between the antenna layers, in which the antenna elements are formed, and the RF IC is reduced as compared to the distance between antenna layers and a die in an AiP. This reduces the clearance distance between the antenna elements and the RF IC, which in turn reduces transmission losses. It may be particularly important to reduce transmission losses in the antenna module that supports higher frequencies (e.g., D-band frequencies) as data transmission rates may be higher thus making it more difficult to maintain the signal-to-noise ratio (SNR) of the RF signals below desired limits. Reduced clearance distance between the antenna elements and the RF IC in the die can also reduce the distance between the antenna elements and a ground plane formed in metal layers of the RF IC (e.g., in the BEOL interconnect structure) to further reduce transmission losses.

In other exemplary aspects, a dielectric material substrate of a dielectric material can be formed adjacent to the semiconductor layer of the RF IC to provide a surface upon which the antenna layers of the antenna substrate can be built upon as part of a wafer fabrication process for the die. In this example, because the die is fabricated using a wafer-level fabrication process, the dielectric material substrate may be formed as a silicon substrate. The dielectric material substrate can serve as a handle in which to form the semiconductor layer and the BEOL interconnect structure of the RF IC. The antenna layers of the antenna substrate can then be built on the dielectric material substrate on an opposite side of the semiconductor layer. The dielectric material substrate can be processed (e.g., ground down) to control the desired clearance distance between the antenna elements formed in the antenna layers of the antenna substrate and the RF IC in the semiconductor layer to control transmission loss. Vias (e.g., through-silicon-vias (TSVs)) can be formed in the antenna substrate and through the semiconductor layer and the BEOL interconnect structure of the RF IC to interconnect the antenna elements to the RF IC. The wafer fabrication process for the RF IC die can support controlling the thickness of the dielectric material substrate between the antenna substrate and the RF IC that is compatible with the process height limits of via formation.

In yet other exemplary aspects, the dielectric material substrate (e.g., a silicon substrate) between the antenna substrate and the RF IC may have a higher permittivity than desired, thus resulting in transmission losses in an undesirable manner. These transmission losses may not be acceptable, especially if the antenna module and its antenna elements are designed to support higher frequency communications. In this regard, in an example, the dielectric material substrate between the antenna substrate and the RF IC of the die can be provided as a porous silicon layer. In this regard, as an example, after the semiconductor layer and the BEOL interconnect structure of the RF IC are formed on the dielectric material substrate in the form of a silicon layer as a handle layer, a porosification process can be performed on the silicon layer to control and tune its permittivity and loss tangent to the desired levels to achieve the desired performance for the supported communication frequencies. Controlling the porosification of the silicon layer between the semiconductor layer and the antenna substrate can control the permittivity of the silicon layer, and thus control transmission losses between the antenna elements in the antenna substrate and the RF IC. In another example, to avoid damaging the semiconductor layer when performing the porosification process on the silicon layer adjacent to the semiconductor layer, an etch stop layer (e.g., a Nitride layer) can be disposed on the silicon layer as a handle layer prior to forming the semiconductor layer on the handle silicon layer. The etch stop layer prevents the porosification of the semiconductor layer when the silicon layer is processed into a porous silicon layer.

In another exemplary aspect, in an antenna module provided as a die that includes the integrated antenna substrate, the antenna layers of the antenna substrate can be formed as redistribution layers (RDLs). The RDLs can be built on a semiconductor wafer as part of a RDL fabrication process of a wafer-level fabrication process. RDL fabrication processes support the formation of smaller L/S metal patterns and smaller pitched metal interconnects. RDLs can also support the redistribution of the connections to the antenna elements such that these connections do not have to be aligned with metal interconnects (e.g., vias) coupling the antenna elements through the antenna substrate to the RF IC.

In this regard, in one exemplary aspect, a semiconductor die is provided. The semiconductor die comprises a semiconductor layer and a BEOL interconnect structure. The semiconductor layer comprises a first side, a back side opposite the first side, and a radio-frequency (RF) circuit. The BEOL interconnect structure is coupled to the RF circuit. The BEOL interconnect structure comprises a front side, and a second side opposite the front side, the second side coupled to the first side of the semiconductor layer. The semiconductor die also comprises an antenna substrate adjacent to the back side of the semiconductor layer. The antenna substrate comprises one or more antenna layers, a first antenna layer of the one or more antenna layers comprising one or more antenna elements. The semiconductor die also comprises one or more first vias each coupling an antenna element of the one or more antenna elements to the BEOL interconnect structure to couple the one or more antenna elements to the RF circuit.

In another exemplary aspect, a method of fabricating a semiconductor die is provided. The method of fabricating the die comprises forming a semiconductor layer comprising a first side, a back side opposite the first side, and a radio-frequency (RF) circuit. The method of fabricating the die also comprises forming a BEOL interconnect structure coupled to the RF circuit, the BEOL interconnect structure comprising a front side, and a second side opposite the front side, the second side coupled to the semiconductor layer. The method of fabricating the die also comprises forming an antenna substrate adjacent to the back side of the semiconductor layer comprising forming one or more antenna layers, wherein a first antenna layer of the one or more antenna layers comprises one or more antenna elements, and forming one or more first vias each coupling an antenna element of the one or more antenna elements to the BEOL interconnect structure to couple the one or more antenna elements to the RF circuit.

DETAILED DESCRIPTION

Figure 1A:
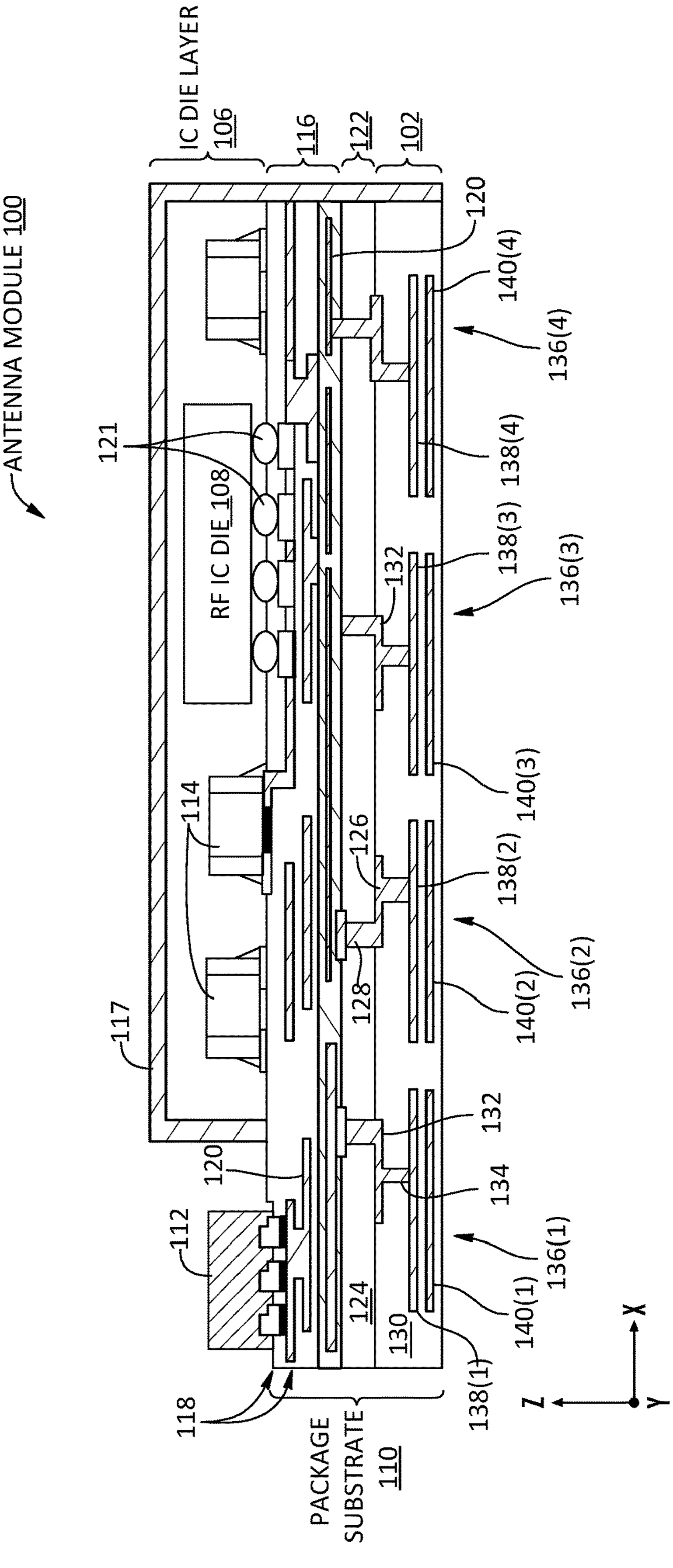
FIGS. 1A and 1B are side views of an antenna module in the form of an antenna-in-package (AiP) that includes a radio-frequency (RF) integrated circuit (IC) die coupled to a package substrate supporting antennas formed in metallization layers therein.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include an antenna module as a radio-frequency (RF) integrated circuit (IC) semiconductor die ("die") with an integrated antenna substrate. The die with the integrated antenna substrate can be provided as part of a single IC chip that is fabricated as part of a wafer-level fabrication process as an example. Such related fabrication processes are also disclosed. The die includes a RF IC that includes a RF circuit (e.g., a front-end RF circuit) that includes RF signal transmission and/or reception capability. The RF IC is coupled to antenna elements in the antenna substrate as part of the die to receive and radiate such RF signals. It may be desired for an antenna module to support higher frequency communications that support shorter wavelengths (e.g., D-band frequencies). This may require smaller antenna elements that require fabrication processes that can form metal elements (e.g., metal traces, metal lines) in smaller line-space (L/S) metal patterns with metal interconnects at smaller pitches than may be possible in an antenna-in-package (AiP) for example. In an AiP, the antenna layers are formed in a separate package substrate that is separately fabricated and packaged with a die through coupled bump structures as part of an IC package. In this regard, in exemplary aspects, to be able to form smaller antenna elements in an antenna substrate that support higher frequencies with smaller L/S metal patterns and/or smaller pitch metal interconnects coupled to the antenna elements, the antenna elements are formed in one more antenna layers as part of an antenna substrate that is formed on a semiconductor wafer (e.g., a complementary metal oxide semiconductor (CMOS) wafer). The RF IC is formed in a semiconductor wafer as part of a die. In this manner, the antenna layers can be formed as part of a wafer-level fabrication process used to form the RF IC in the semiconductor wafer and to form the antenna layers in the same die with smaller L/S metal patterns and/or smaller pitch metal interconnects to support antenna elements capable of supporting higher frequency communications. Also, by providing an antenna module that integrates the antenna substrate in a die, the antenna module can be fully tested at the wafer level if desired, to improve quality and yield.

Before discussing examples of a die that provides an antenna module, wherein the die includes an RF IC with a RF circuit, and an integrated antenna substrate to provide an antenna for the RF circuit starting at FIG. 2A, an example of an antenna module 100 that is provided in the form of an AiP as a package-on-package (POP) structure is first discussed with reference to FIGS. 1A and 1B below.

In this regard, FIG. 1A is a side view of the antenna module 100 that is an IC package that is configured in a side-by-side arrangement. FIG. 1B is also a partial side view of the antenna module 100 in FIG. 1A, but rotated one-hundred eighty (180) degrees in the vertical direction (Z-axis direction) to further illustrate the antenna module 100. The antenna module 100 includes an antenna substrate 102 that supports antenna elements (e.g., patch and/or dipole antenna elements) for supporting RF communications. The antenna module 100 includes an IC die layer 106 disposed in a horizontal plane (X-axis and Y-axis direction plane), wherein the IC die layer 106 includes a RF IC semiconductor die (RF IC die) 108 that includes a RF transceiver. The RF IC die 108 may be in the form of an encapsulated IC chip 109. The IC die layer 106 with the RF IC die 108 is mounted to a package substrate 110 to provide a support structure for the IC die layer 106 and to also provide an interconnect structure for coupling the RF IC die 108 to other components and circuits in the antenna module 100. The antenna module 100 could also include a separate adjacent power management IC (PMIC) die 112 (which may also be an IC chip) as shown in FIG. 1A that provides a power source for the RF IC die 108. The RF IC die 108 and the PMIC die 112 are arranged in a side-by-side arrangement in a horizontal direction (X-axis direction). The IC die layer 106 also includes other passive components 114 (e.g., capacitors, inductors) that are electrically coupled through the package substrate 110 to the RF IC die 108 and/or the PMIC die 112 as part of the circuits formed therein. The size of these passive components 114 may be such that it is not desirable or not feasible to integrate them into the RF IC die 108 or the PMIC die 112. An electromagnetic interference (EMI) shield 117 is disposed around the RF IC die 108 and other components in the IC die layer 106.

With continuing reference to FIG. 1A, in this example, the package substrate 110 includes a metallization substrate 116 that is adjacent to the IC die layer 106. The metallization substrate 116 includes a plurality of substrate metallization layers 118 that each include metal interconnects 120 (e.g., pads, vertical interconnect accesses (vias), traces, lines) formed therein for providing interconnection structures to facilitate interconnections to provide an electrical interface between the RF IC die 108 and other components and circuits in the antenna module 100. Die interconnects 121 couple the RF IC die 108 to the metal interconnects 120 in the metallization substrate 116. The metallization substrate 116 may be a coreless substrate. The substrate metallization layers 118 could be formed as separate substrate layers that are laminated together to form the metallization substrate 116. In this example, the metallization substrate 116 is coupled to a core substrate 122 as part of the package substrate 110. The core substrate 122 also includes one or more metallization layers 124 that include metal interconnects 126 coupled to vias 128 (e.g., metal pillars) coupled to the metal interconnects 120 in the adjacent metallization substrate 116 to provide electrical connectivity between the metallization substrate 116 and the core substrate 122.

Figure 1B:
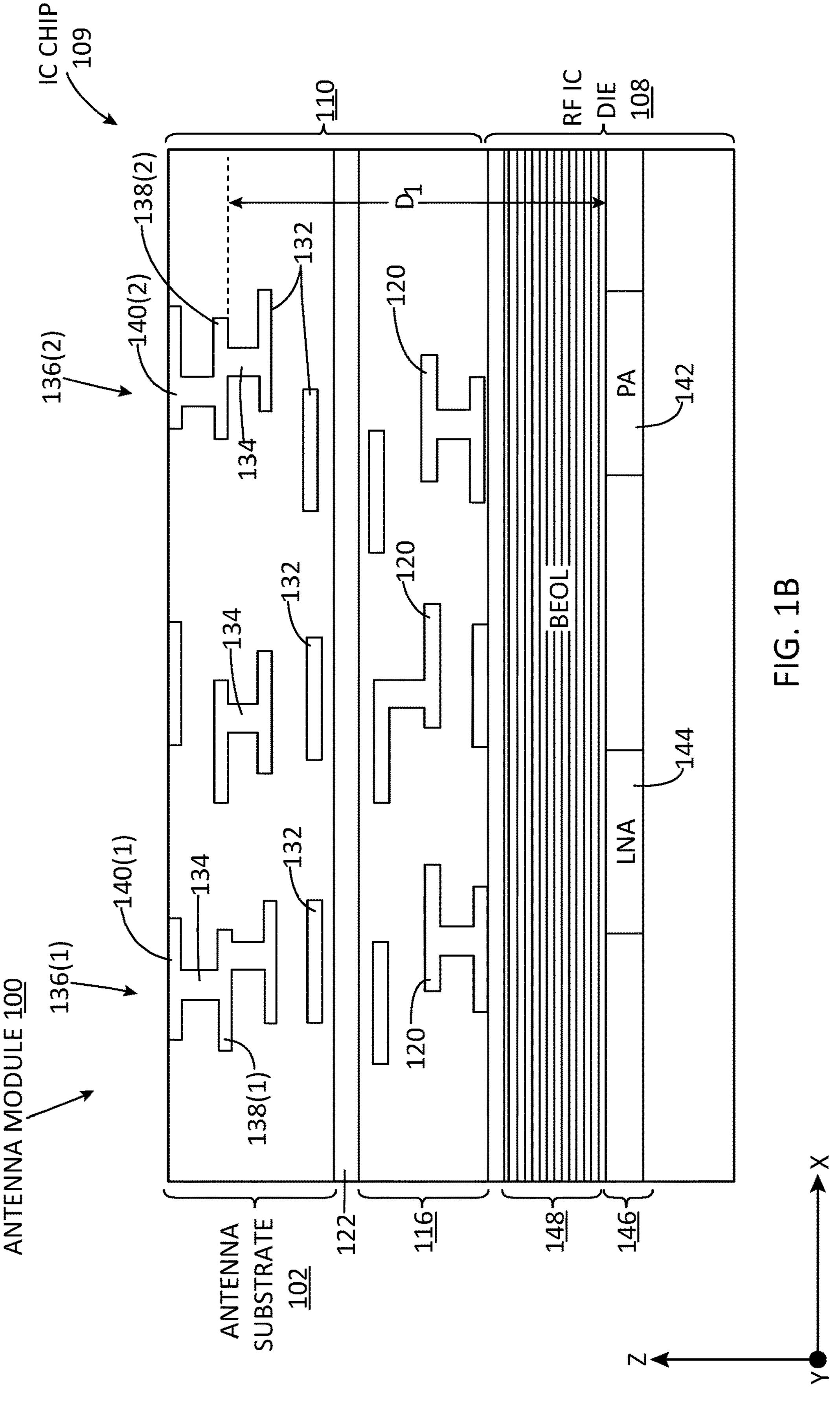

With continuing reference to FIGS. 1A and 1B, the package substrate 110 in the antenna module 100 also includes the antenna substrate 102, which may be a prepreg or laminate substrate. The antenna substrate 102 is coupled to the core substrate 122 such that the core substrate 122 is disposed between the antenna substrate 102 and the metallization substrate 116 in the vertical direction (Z-axis direction) in this example. The antenna substrate 102 also includes one or more metallization layers 130 that include metal interconnects 132 coupled to vias 134 coupled to the metal interconnects 126 in the core substrate 122. The antenna substrate 102 includes four (4) antennas 136(1)-136(4) in this example, which include metal patches, that are electrically coupled to the RF IC die 108 through interconnections between the antennas 136(1)-136(4) and the metal interconnects 120, 126, 132 in the respective metallization substrate 116, core substrate 122, and antenna substrate 102. In this example, each antenna 136(1)-136(4) is a patch antenna that includes antenna elements in the form of first antenna elements 138(1)-138(4) in the form of metal patches adjacent to the core substrate 122 and second metal patches 140(1)-140(4) disposed below the respective first antenna elements 138(1)-138(4). The first antenna elements 138(1)-138(4) are coupled to the RF IC die 108 through the via 134 and the metal interconnects 132, 126, 120 acting as an antenna feed line. The second metal patches 140(1)-140(4) are not in contact with the first antenna elements 138(1)-138(4), but instead, the second metal patches 140(1)-140(4) are configured to be electro-magnetically (EM) coupled to the first antenna elements 138(1)-138(4) when the first antenna elements 138(1)-138(4) receive a RF signal to be radiated. Similarly, when the second metal patches 140(1)-140(4) are energized by a received RF signal, the second metal patches 140(1)-140(4) are EM coupled to the first antenna elements 138(1)-138(4) with the received RF signal.

The antenna elements 138(1)-138(4), 140(1)-140(4) in the antenna substrate 102 of the antenna module 100 are sized to support the desired wavelengths of communication frequency ability of the antenna module 100 desired. As an example, the antenna elements 138(1)-138(4), 140(1)-140(4) may be metal patches that are 3.0 millimeters (mm) by 3.0 mm to support the 5G communication frequency spectrum. The fabrication processes available to fabricate an AiP like the antenna module 100 in FIG. 1B may be sufficient to provide for the metal interconnects 132 in the antenna substrate 102 to support a L/S metal pattern and pitch to support interconnection to the antenna elements 138(1)-138(4), 140(1)-140(4) according to their shape and size. However, as an example, for higher communications frequencies, such as in the D-band frequency spectrum, the wavelength supported by the antenna elements 138(1)-138(4), 140(1)-140(4) may be such that the antenna elements 138(1)-138(4), 140(1)-140(4) need to be fabricated in metallization layers of the antenna substrate 102 of a much smaller size (e.g., 150 micrometers (μm) by 150 μm). This is because the higher the frequency of a signal, the smaller its wavelength will be. The fabrication techniques available to fabricate the antenna substrate 102 may not be capable of forming the metal interconnects 132 in the antenna substrate 102 at a small or fine enough L/S metal pattern and pitch to be able to interconnect to the smaller antenna elements. Thus, an antenna module like the antenna module 100 in FIGS. 1A and 1B, which is an AiP or POP package, may not be able to be fabricated sufficiently to support higher frequency communications.

With reference to FIG. 1B, the clearance shown as distance $D_1$ between the antenna elements 138(1)-138(2) and the RF IC die 108 of the antenna module 100 also needs to be compatible to provide for a desired tradeoff of transmission loss versus form factor of the antenna module 100. Only antenna elements 138(1)-138(2) and 140(1)-140(2) for antennas 136(1)-136(2) are shown in FIG. 1B. As shown in FIG. 1B, in this example, the RF IC die 108 includes a power amplifier (PA) 142 and a low-noise amplifier (LNA) 144 formed in a semiconductor layer 146. The RF IC die 108 also includes a back-end-of-line (BEOL) interconnect structure 148 that includes a plurality of metal layers of insulated metal lines or traces to provide interconnection paths in a vertical direction (Z-axis direction) between the PA 142 and LNA 144, and the metallization substrate 116. These PA 142 and LNA 144 are exemplary circuits in the RF IC die 108 that support RF signal reception and transmission capability with the antennas 136(1)-136(2). The PA 142 and the LNA 144 are located distance $D_1$ from the antenna elements 138(1)-138(2). As the frequency of a signal increases, transmission losses also increase. Thus, it may be important to provide short interconnection paths between the RF IC die 108 and the antenna elements 138(1)-138(2) in the antenna module 100 to reduce transmission losses. In the antenna module 100 in FIG. 1B as an AiP, the clearance distance $D_1$ may be between 500-600 μm based on the size of the antenna substrate 102, the core substrate 122, and the metallization substrate 116 according to their fabrication techniques. Also, if the clearance distance $D_1$ is too large, there is a risk of increased EMI (and thus a lower signal-to-noise ratio (SNR)) between the RF IC die 108 and the antenna elements 138(1)-138(2) leading to reduced performance. The clearance distance $D_1$ also affects the distance between the antenna elements 138(1)-138(2) and a ground plane that may be provided in the metallization substrate 116 for example. The clearance distance $D_1$ also affects the clearance distance between the antenna elements 138(1)-138(2) and any ground plane, because the clearance distance $D_1$ affects the antenna's impedance, radiation pattern, and gain, which affect data transfer rates.

This clearance distance $D_1$ between the antenna elements 138(1)-138(2) and the RF IC die 108 may be acceptable to provide the desired performance in the antenna module 100 for mmWave frequencies for example, but this clearance distance $D_1$ may result in unacceptable losses for higher frequencies (e.g., D-band frequencies). For example, the clearance distance $D_1$ between the antenna elements 138(1)-138(2) and the RF IC die 108 may ideally be 70-80 μm to avoid transmission losses between the RF IC die 108 and the antenna elements 138(1)-138(2) that would result in unacceptable performance based on the performances parameters affected by such clearance distance as discussed above. It may not be possible to fabricate the antenna module 100 in FIGS. 1A and 1B with such a reduced clearance distance $D_1$ between the antenna elements 138(1)-138(2) and the RF IC die 108 due to the POP configuration and due to the fabrication process limitations for fabricating the antenna substrate 102, the core substrate 122, and/or the metallization substrate 116 of the package substrate 110 of the antenna module 100.

Thus, in conclusion, the antenna module 100 as an AiP in FIGS. 1A and 1B may not be feasible for supporting higher frequency RF signals, such as in the D-band frequency spectrum for example. To support transmission of higher frequency RF signals, the antenna elements may need to be fabricated to be smaller in size to be compatible with (i.e., support) smaller wavelengths of higher frequency RF signals. This may require an antenna substrate of an antenna module to be fabricated with metal interconnects of a smaller L/S pattern and/or pitch that is capable to be fabricated in an antenna substrate 102 like in the antenna module 100 in FIGS. 1A and 1B according to package substrate fabrication technologies. Antenna elements that are sized to support smaller wavelengths are smaller in size such that metal interconnects in the antenna substrate 102 may not be able to be fabricated small enough to provide interconnections to the antenna elements without risking shorts. Also, to support such higher frequency RF signals, the clearance distance $D_1$ between the antenna elements 138(1)-138(2) and the RF IC die 108 needs to be reduced to a size smaller than may be able to be provided in the antenna module 100 due to fabrication process limitations to reduce the signal path distance and EMI to achieve a desired SNR.

In this regard, to provide for an antenna module that may be capable of supporting higher RF signal frequencies (e.g., D-band frequencies at 110 to 170 GigaHertz (GHz)) as an example, the antenna module can be formed as part of a die and not an AiP or PoP like the antenna module 100 in FIGS. 1A and 1B. As described in more detail below, integrating the antenna module in a die may allow the metal interconnects in antenna layers in the antenna substrate in the antenna module to be fabricated of a smaller L/S pattern and/or pitch to able to provide interconnects to smaller antenna elements formed there to support higher RF signal frequencies. Further, as described in more detail below, integrating the antenna module in a die may also allow the clearance distance between the antenna elements and the coupled ICs in the die that are the circuits to support RF signal transmission and reception to be reduced as a function of the fabrication process techniques that can be employed to fabricate the die. The die can be fabricated using a wafer-level fabrication process, which can allow antenna layers of antenna substrate to be built up on a substrate in the wafer to minimize the height distance of the antenna layers and thus minimize the clearance distance between the antenna elements and the coupled ICs in the die. These possibilities may allow the antenna module integrated into the die to be fabricated in a manner that is compatible with and can support higher RF signal frequencies that may not otherwise be possible in an AiP, like the antenna module 100 in FIGS. 1A and 1B.

Figure 2A:
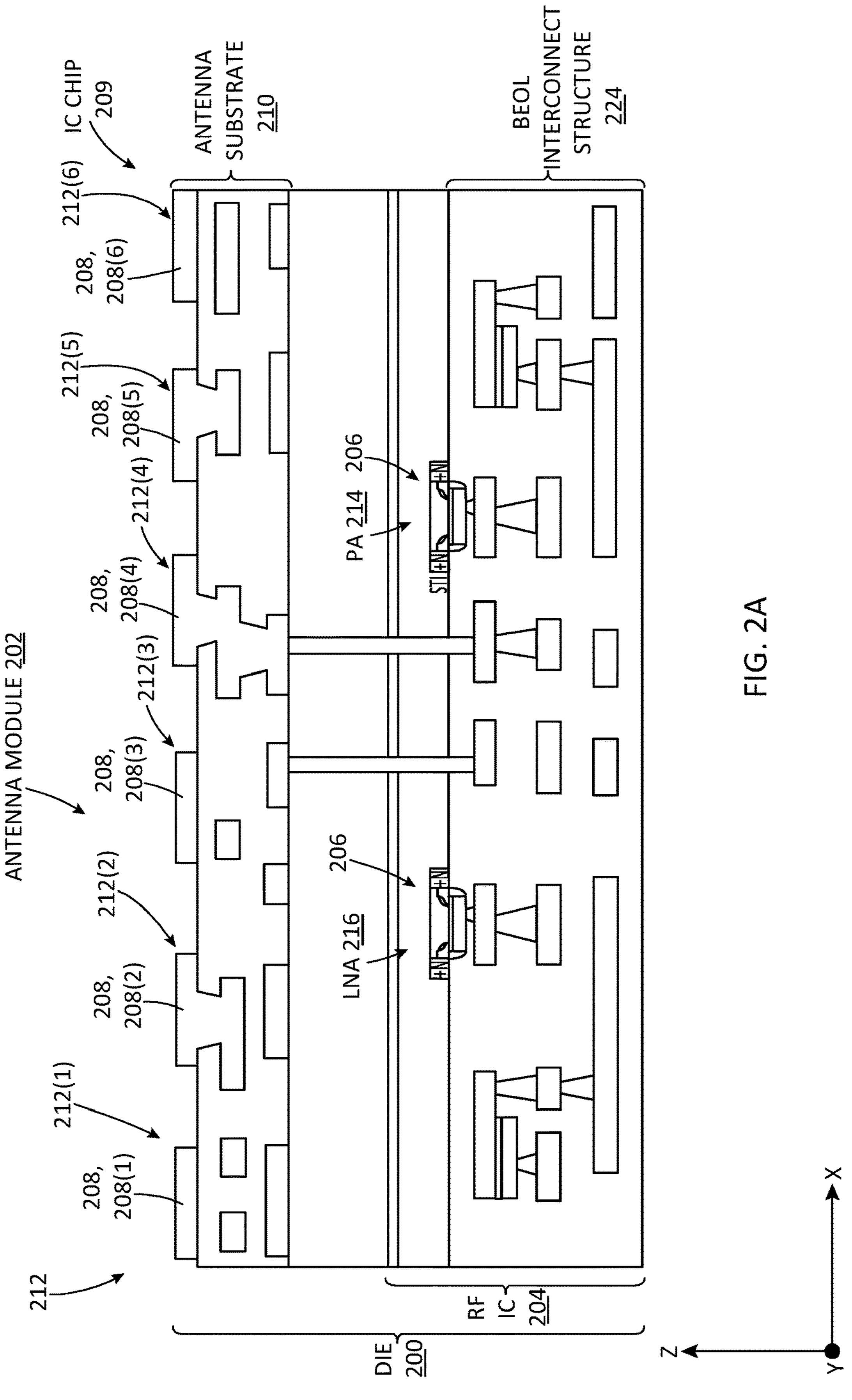
FIGS. 2A and 2B are side views of an exemplary semiconductor die ("die") that provide an antenna module, wherein the die includes a RF IC with a RF circuit, and an integrated antenna substrate to provide an antenna for the RF circuit, wherein the antenna substrate is adjacent to the back side of the RF IC.
Figure 2B:
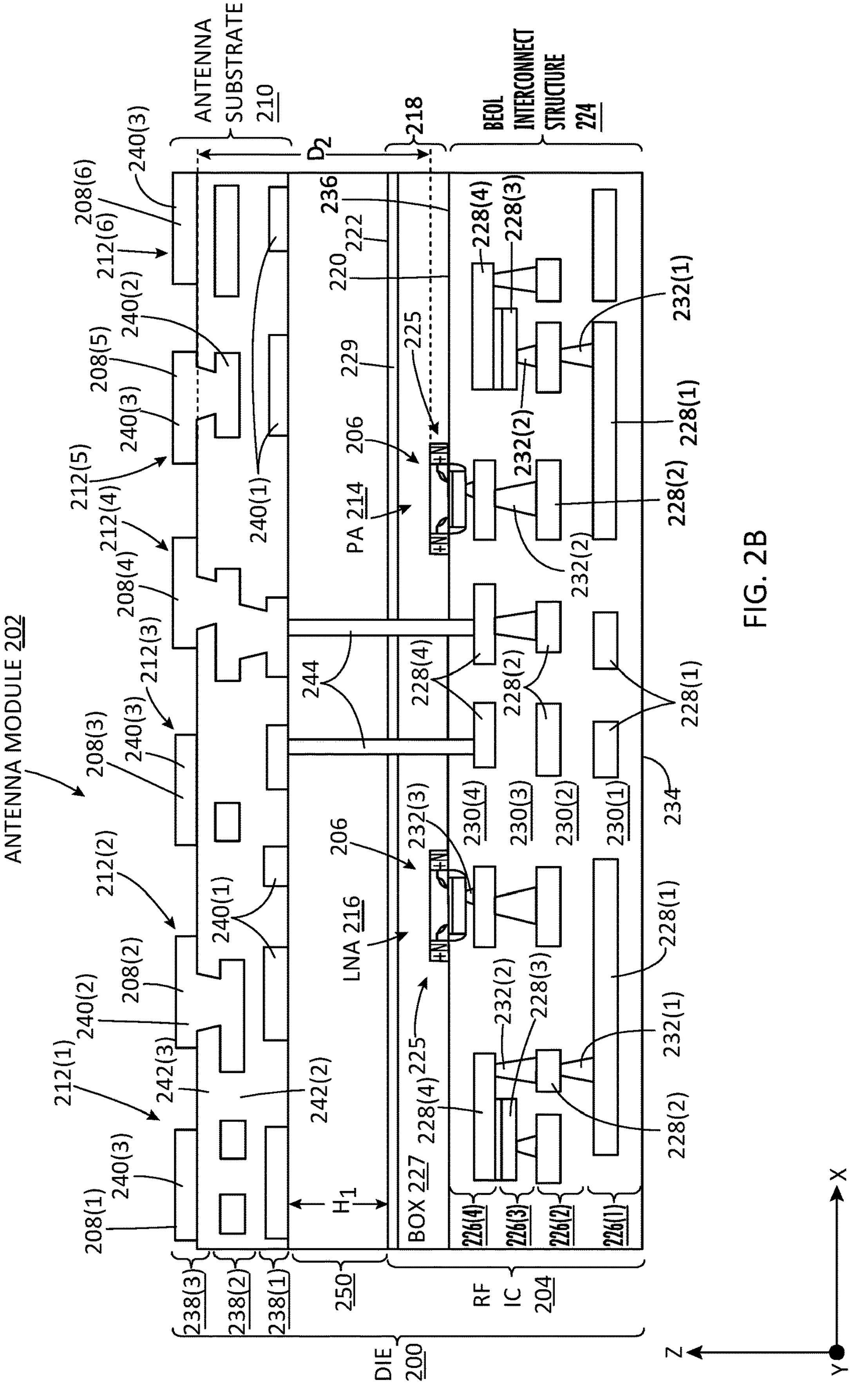

In this regard, FIGS. 2A and 2B are side views of an exemplary die 200 that provides an integrated antenna module 202 integrated into the die 200 that is capable of supporting higher frequency RF signals (e.g., D-band frequencies). However, the die 200 in FIGS. 2A and 2B is not required to support RF signals of any particular frequency or frequency band. The die 200 is a RF die that is a semiconductor die that includes a RF IC 204 with RF circuits 206. The RF circuits 206 are electrically coupled to antenna elements 208 in an integrated antenna substrate 210 provided in the die 200 to provide an antenna(s) 212 for the RF circuits 206. In this example, six (6) antenna elements 208(1)-208(6) in the form of metal patch antennas that form patches in the horizontal directions (X-axis and Y-axis directions) form six (6) respective antennas 212(1)-212(6), but such is not limiting. In this manner, as discussed in more detail below, the die 200 with the integrated antenna substrate 210 can be provided as part of a single IC chip 209 that is fabricated as part of a wafer-level fabrication process as an example. The die 200 includes the RF IC 204 that includes the RF circuits 206 (e.g., front-end RF circuits) to provide RF signal transmission and/or reception capability. In this example, for the antenna module 202 integrated in the die 200 with smaller L/S patterns and/or smaller pitch metal interconnects in the antenna substrate 210 to support interconnections to antenna elements supporting higher RF signal frequencies, the antenna elements 208(1)-208(6) are formed in the antenna substrate 210 on a semiconductor wafer (e.g., a complementary metal oxide semiconductor (CMOS) wafer). The RF IC 204 is formed in the semiconductor wafer as part of the die 200. In this manner, the antenna substrate 210 can be formed as part of a wafer-level fabrication process used to form the RF IC 204 in the semiconductor wafer and to form the antenna substrate 210 with smaller L/S patterns and/or smaller pitch metal interconnects to support antenna elements capable of supporting higher frequency communications. Also, by providing the antenna module 202 that integrates the antenna substrate 210 in the die 200, the antenna module 202 can be fully tested at the wafer level if desired, to improve quality and yield.

With continued reference to FIG. 2B, the die 200 in this example includes the RF IC 204 that includes the RF circuits 206. The RF circuits 206 can be included as part of a LNA 214 and PA 216 (and/or e.g., other front-end RF circuits) to provide RF signal transmission and/or reception capability as an example. The RF IC 204 includes a semiconductor layer 218 (e.g., a silicon layer) where active electrical devices (e.g., transistors) are formed (and thus can also be referred to as an "active semiconductor layer"). The semiconductor layer 218 has a first side 220 and a side 222 opposite the first side 220 in the vertical direction (Z-axis direction). The opposite side 222 of the semiconductor layer 218 is also referred to as a "back side" 222, because it is the side of the semiconductor layer 218 that is not adjacent to the BEOL interconnect structure 224, whereas the "first side 220" is adjacent to the BEOL interconnect structure 224. The back side 222 of the semiconductor layer 218, which is the back side 222 of the RF IC 204 in this example, has a back side or back surface in this example that is on the opposite side of the first side 220 adjacent to where the RF circuits 206 are formed. The back side 222 of the RF IC 204 may not contain active electronic components or electrical connections. Active components 225, such as transistors, may be formed in the semiconductor layer 218 as part of the RF circuits 206 adjacent to the first side 220 of the semiconductor layer 218 that is adjacent to and may be coupled to the BEOL interconnect structure 224. In this example, the RF IC 204 is a semiconductor-on-insulator (SOI) device, because the semiconductor layer 218 includes a semiconductor substrate 229 (e.g., silicon substrate) adjacent to the back side 222 of the semiconductor layer 218 and a buried oxide (BOX) layer 227 adjacent to the first side 220 of the semiconductor layer 218. The BOX layer 227 is between the semiconductor substrate 229 and the first side 220 of the semiconductor layer 218. The BOX layer 227 creates a buried insulating layer between the semiconductor substrate 229 and the first side 220 of the semiconductor layer 218.

With continuing reference to FIG. 2B, the RF IC 204 also includes the BEOL interconnect structure 224 adjacent to the semiconductor layer 218. Typically, the BEOL interconnect structure 224 is formed on the semiconductor layer 218 as part of a BEOL fabrication process in a wafer fabrication process after the semiconductor layer 218 semiconductor substrate has been fabricated and the active components 225 are formed in the semiconductor layer 218 as part of a front-end-of-line (FEOL) fabrication process. The BEOL interconnect structure 224 includes a plurality of metal layers 226(1)-226(4) (also known as metallization layers 226(1)-226(4)) that are adjacent to each other in a vertical direction (Z-axis direction) that each include metal interconnects 228(1)-228(4) formed as metal traces or metal lines in a respective insulating layer 230(1)-230(4). Second vias 232(1)-232(3) (e.g., through-silicon-vias (TSVs)) are formed in the respective metal layers 226(2)-226(4) to interconnect the metal interconnects 228(1)-228(4) in different metal layers 226(1)-226(4) to form signal routing paths to the RF IC 204 and between the RF IC 204 and the antenna substrate 210. The BEOL interconnect structure 224 has a front side 234 and a second side 236 opposite the front side 234 in the vertical direction (Z-axis direction). The second side 236 of the BEOL interconnect structure 224 is adjacent to and coupled to the semiconductor layer 218 and its RF circuit 206 in this example. The side 234 of the BEOL interconnect structure 224 is also referred to as a "front side" 234 of the RF IC 204, because it is the side of the RF IC 204 that is adjacent to the external metal interconnects where the die 200 is coupled to an external device as part of the BEOL interconnect structure 224. The front side 234 of the RF IC 204 and BEOL interconnect structure 224 is a side of the RF IC 204 where the metal interconnects 228(1) of the BEOL interconnect structure 224 are formed to provide connections to the RF circuits 206. With reference to FIGS. 2A and 2B, the antenna substrate 210 is provided in the die 200 adjacent to the back side 222 of the RF IC 204. In this example, the antenna substrate 210 is non-directly adjacent to the back side 222 of the RF IC 204 being disposed on the same side as the back side 222 of the RF IC 204 opposite the front side 234 of the RF IC 204, because as discussed below, a dielectric material substrate 250 is disposed between the antenna substrate 210 and the back side 222 of the RF IC 204 in the vertical direction (Z-axis direction). Non-directly (or indirectly) adjacent means that an object (e.g., the antenna substrate 210) is not directly beside or in contact with another object (e.g., the back side 222), but there is another intervening object between such objects. As an alternative option, the antenna substrate 210 could be directly adjacent to the back side 222 of the RF IC 204. Directly adjacent objects are objects that are directly next to each other or coupled to each other without the presence of an intervening object between them.

In this example die 200 in FIGS. 2A and 2B, the antenna substrate 210 includes a plurality of antenna layers 238(1)-238(3). The antenna layers 238(1)-238(3) may be metal layers or metallization layers that are fabricated like or similar to the metal layers 226(1)-226(4) in the BEOL interconnect structure 224. Metal interconnects 240(1)-240(3) in the form of metal lines or traces can be formed in the respective antenna layers 238(1)-238(3). The metal interconnects 240(3) formed in the first antenna layer 238(3) in this example are the antenna elements 208(1)-208(6) that each form respective antennas 212(1)-212(6). For example, the antenna elements 208(1)-208(6) can be metal patch antennas. As an example, because the antenna substrate 210 can be fabricated as an integrated part of the die 200, the same wafer-level processing techniques used to fabricate the RF IC 204 can also be used to fabricate the antenna layers 238(1)-238(3) of the antenna substrate 210. In this manner, it may be feasible to fabricate the metal interconnects 240(1)-240(3) (e.g. metal lines or metal traces) in the respective antenna layers 238(1)-238(3) of a sufficiently smaller L/S metal pattern and/or pitch to form smaller antenna elements 208(1)-208(6) and metal interconnects 240(1)-240(3) that are of a sufficient resolution to provide interconnections to the antenna elements 208(1)-208(6). For example, the antenna elements 208(1)-208(6) may each support a wavelength less than or equal to one (1) mm. The antenna substrate 210 can be fabricated by building up the antenna layers 238(1)-238(3) directly or non-directly adjacent to the back side 222 of the RF IC 204 so that the antenna elements 208(1)-208(6) do not have to be formed in the BEOL interconnect structure 224 to minimize routing complexity in the BEOL interconnect structure 224. Also, it may be desirable to fabricate the antenna substrate 210 directly or non-directly adjacent to the back side 222 of the RF IC 204, so that the first, clearance distance $D_2$ between the antenna elements 208(1)-208(6) and the RF circuits 206 can be controlled to reduce transmission loss in RF signals communicated by the RF circuits 206 and the antenna elements 208(1)-208(6) as discussed in more detail below.

For example, the first antenna layer 238(3) in the antenna substrate 210 in which the antenna elements 208(1)-208(6) are formed may be formed as a first re-distribution layer (RDL) that includes metal interconnects 240(3) embedded in a respective dielectric material, insulating layer 242(3) of the first antenna layer 238(3). The second antenna layer 238(2) of the antenna layers 238(1)-238(2) in this example is also a second RDL with its metal interconnects 240(2) embedded in an insulating layer 242(2) such that the antenna substrate 210 is a multi-level RDL. One non-limiting benefit of providing one or more of the antenna layers 238(2), 238(3), including the first antenna layer 238(3), as a RDL is the ability to redistribute signal routing within and between the antenna substrate 210 and the BEOL interconnect structure 224. For example, first vias 244 are formed in the die 200 to interconnect metal interconnects 240(1) in the antenna layer 238(1) to metal interconnects 228(4) in the first metal layer 226(4) in the BEOL interconnect structure 224. This provides a signal routing path between the antenna elements 208(1)-208(6) in the antenna substrate 210 and the RF circuits 206 through interconnections of metal interconnect 228(1)-228(4) coupled to the first vias 244, to the RF circuits 206. For example, the first vias 244 may be TSVs. The first vias 244 are disposed in a vertical direction (Z-axis direction) in the die 200, but through the RDLs in the antenna layers 238(2), 238(3), the signal routing paths that include the first vias 244 can be re-distributed in horizontal directions (X-axis and/or Y-axis directions) to be coupled to other metal interconnects 240(2)-240(3) and to the desired antenna element(s) 208(1)-208(6).

Another non-limiting benefit of providing one or more of the antenna layers 238(2)-238(3), including the first antenna layer 238(3), as a RDL is to provide for a reduced layer height in the vertical direction (Z-axis direction). This is in part because the metal interconnects 240(2), 240(3) in the respective antenna layers 238(2), 238(3) are embedded in respective insulating layers 242(2), 242(3). The process of forming the metal interconnects 240(2), 240(3) in the respective antenna layers 238(2), 238(3) as RDLs also allows the metal interconnects 240(2), 240(3) to be formed from a smaller L/S metal pattern and/or with a smaller pitch so that, for example, the antenna elements 208(1)-208(6) can be made of a smaller size to support smaller wavelengths to support higher RF frequencies and to provide the metal interconnects 240(2), 240(3) with a fine enough resolution to provide interconnections to the antenna elements 208(1)-208(6). For example, the metal interconnects 240(1)-240(3) formed in the antenna layers 238(1)-238(3) may have a L/S metal pattern less than 3 μm. As another example, the pitch of the metal interconnects 240(1)-240(3) formed in the antenna layers 238(1)-238(3) may be less than five (5) μm, and between 3.0 to 5.0 μm as another example. As another example, the antenna elements 208(1)-208(2) may be fabricated in the first antenna layer 238(3) to have dimensions in the horizontal directions (X-axis and Y-axis directions) that are less than or equal to 500 μm. For example, the antenna elements 208(1)-208(6) may be fabricated in the first antenna layer 238(3) to have dimensions in the horizontal directions (X-axis and Y-axis directions) that are less than 1 millimeter (mm). As another example, the antenna elements 208(1)-208(6) may be sized to be less than or equal to 500 μm to support higher frequencies. For example, to support D-band frequencies, the antenna elements 208(1)-208(6) may be sized to be approximately 150 μm by 150 μm metal patch antennas in the first antenna layer 238(3).

As discussed above, the first, clearance distance $D_2$ between the antenna elements 208(1)-208(6) and the RF circuits 206 can affect the transmission loss of RF signals between the antenna elements 208(1)-208(6) and the RF circuits 206. As shown in FIG. 2B, by integrating the antenna substrate 210 with the RF IC 204 as part of the die 200, the first, clearance distance $D_2$ can be reduced due to the ability to form the antenna layers 238(1)-238(2) in the antenna substrate 210 of reduced height in the vertical direction (Z-axis direction). This compared to an antenna substrate 102 as part of a package substrate 110 in the antenna module 100 as an AiP in FIGS. 1A and 1B that has a larger height in the vertical direction (Z-axis direction) than the antenna substrate 210 in the die 200. For example, it may be desired for the first, clearance distance $D_2$ between the antenna elements 208(1)-208(6) and the RF circuits 206 to be between seventy (70) and eighty (80) μm to support higher frequency RF signals.

In this example, to not only provide a substrate in which to form the antenna substrate 210 when fabricating the die 200, but to also control the first, clearance distance $D_2$ between the antenna elements 208(1)-208(6) and the RF circuits 206, a dielectric material substrate 250 is also provided in the die 200. The dielectric material substrate 250 is a substrate of dielectric material that is disposed between the antenna substrate 210 and the RF IC 204, and more particularly, the back side 222 of the RF IC 204 and its semiconductor layer 218, in the die 200. For example, the dielectric material substrate 250 could be a silicon substrate, which is a readily available material used in wafer-level processing and that can be used to form the dielectric material substrate 250 during fabrication of the die 200. A first thickness or first height $H_1$ of the dielectric material substrate 250 can be controlled during fabrication of the die 200 (e.g., by a grinding process) to control the first, clearance distance $D_2$ between the antenna elements 208(1)-208(6) and the RF circuits 206. For example, the first height $H_1$ of the dielectric material substrate 250 may be between 50-60 μm. For example, to achieve a first, clearance distance $D_2$ between the antenna elements 208(1)-208(6) and the RF circuits 206 between seventy (70) and eighty (80) μm to support higher frequency RF signals, the first height $H_1$ of the dielectric material substrate 250 between the antenna substrate 210 and the back side 222 of the RF IC 204 may be between 40 and 60 μm.

The permittivity of the dielectric material substrate 250 can affect the RF transmission losses in RF signals between the RF circuits 206 and the antenna elements 208(1)-208(6). For example, the dielectric material substrate 250 can be formed of a dielectric material such that it has a permittivity less than 6.0 farads per meter (F/m). Forming the dielectric material substrate 250 and controlling the selection of its dielectric material and fabrication methods also allows control of the loss tangent and resistivity of the dielectric material substrate 250 to control RF transmission losses. For example, the dielectric material substrate 250 may be selected from a dielectric material and fabricated such that its loss tangent at 20 GHz is approximately $2\times10^{-3}$. As another example, the dielectric material substrate 250 may be selected from a dielectric material and fabricated such that its resistivity is greater than $10^7$ Ohms/centimeter (cm). The antenna module 202 that is integrated in the die 200 may have various improvements, such as improved isolation between RF circuits 206 (e.g., >=20 dB), the antennas 212 have an effective isotropic radiated power (EIRP) of approximately 2 dB, and with an overall cost reduction.

Figure 3:
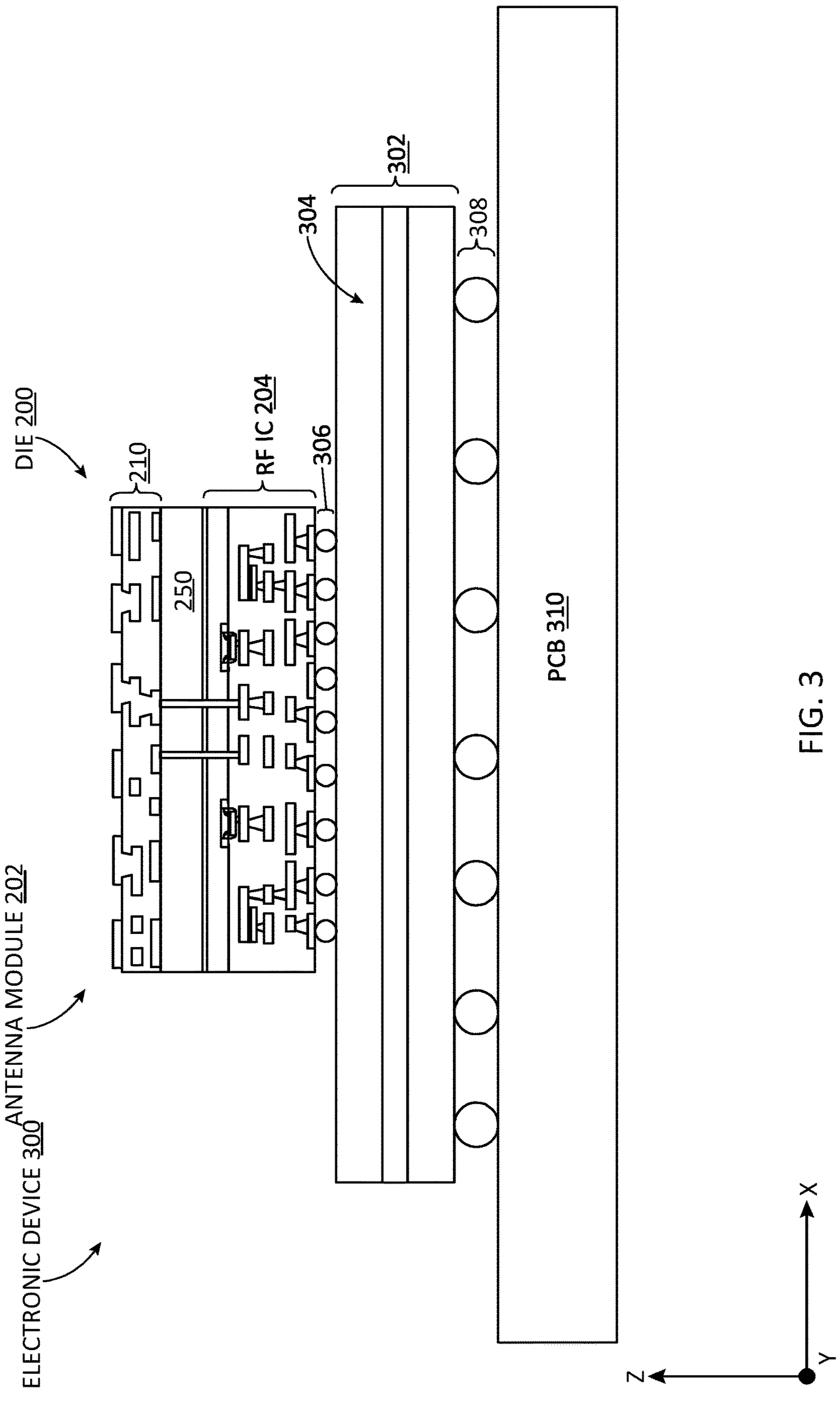
FIG. 3 is a side view of an exemplary electronic device that includes the semiconductor die in FIGS. 2A and 2B coupled to a package substrate, which in turn is coupled to a circuit board.

FIG. 3 is a side view of an exemplary electronic device 300 that includes the die 200 as the antenna module 202 in FIGS. 2A and 2B coupled to a package substrate 302. For example, the package substrate 302 may include metallization layers 304 that provide signal routing paths to route signals to and from the antenna module 202. Die interconnects 306 (e.g., metal pads, micro-bumps, bumps formed on under bump metallization (UBM) pads) are formed in contact with metal interconnects 228(1) in the metal layer 226(1) of the BEOL interconnect structure 224 that are then coupled to the package substrate 302. The package substrate 302 may be a package substrate that includes metallization layers like the metallization substrate 116 in FIGS. 1A and 1B as an example. External interconnects 308 (e.g., solder bumps, ball grid array (BGA) interconnects) are formed in contact with the package substrate 302 and can be coupled to a printed circuit board (PCB) 310 to electrically couple the antenna module 202 to the PCB 310 and to other electronic circuits coupled to the PCB 310.

With reference back to FIGS. 2A and 2B, the introduction of the dielectric material substrate 250 into the die 200 may cause an unintended consequence in RF transmission losses in RF signals between the RF circuits 206 and the antenna elements 208(1)-208(6). The permittivity of the dielectric material substrate 250 can affect the RF transmission losses in RF signals between the RF circuits 206 and the antenna elements 208(1)-208(6). For example, the dielectric material substrate 250 being formed from silicon as a silicon substrate may have a higher permittivity than FR4 or another material used to fabricate a package substrate, such as the package substrate 110 in the antenna module 100 in FIGS. 1A and 1B. Thus, while the introduction of the dielectric material substrate 250 can assist in controlling the first, clearance distance $D_2$ between the antenna elements 208(1)-208(6) and the RF circuits 206 to be between seventy (70) and eighty (80) μm to support higher frequency RF signals, the dielectric material substrate 250 can also contribute to RF transmission losses in RF signals between the RF circuits 206 and the antenna elements 208(1)-208(6) in an unintended and undesirable manner, that may cause the antenna module 202 to not be able to support the desired frequency spectrum with sufficient performance.

Figure 4:
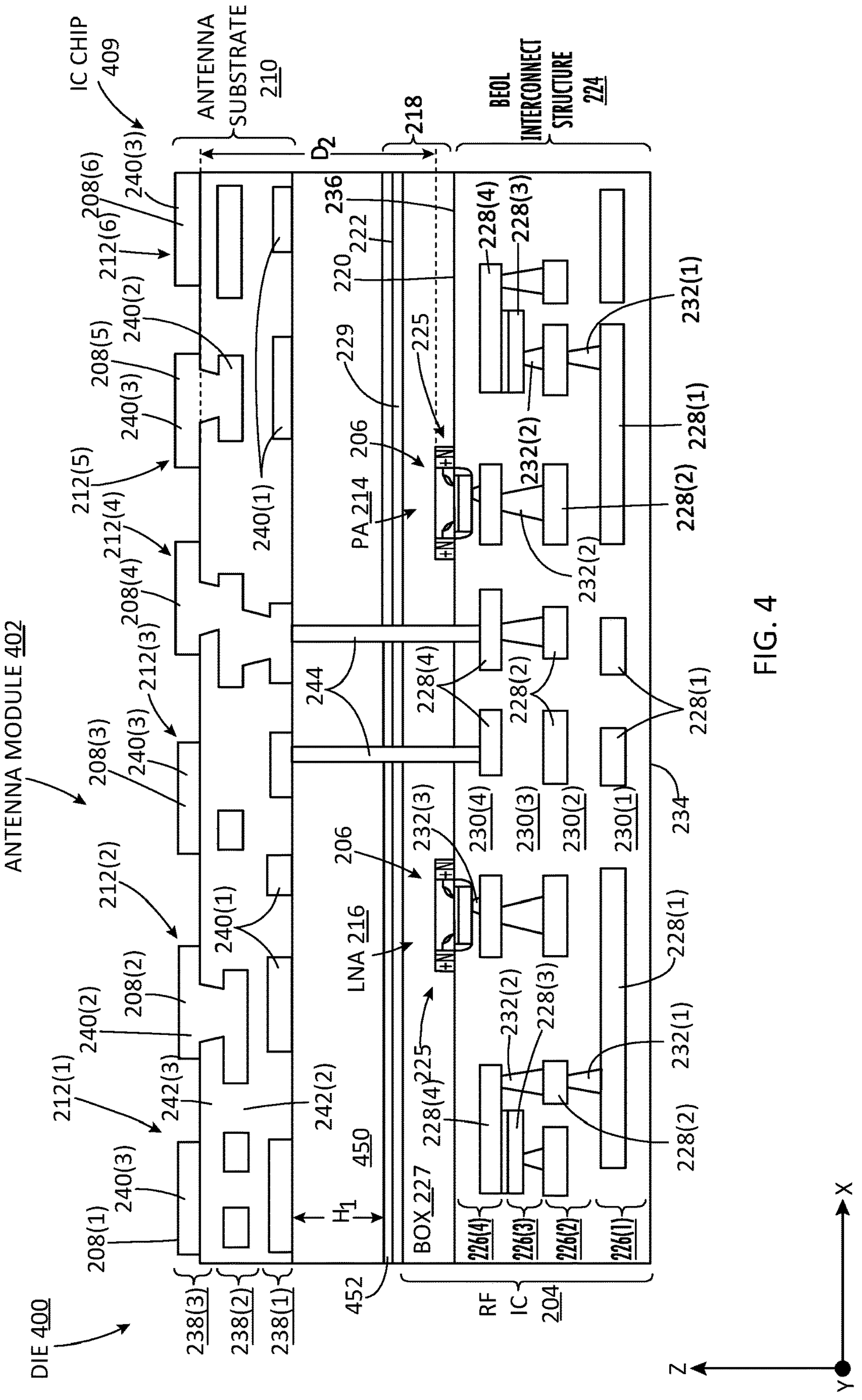
FIG. 4 is a side view of another exemplary die that provides an antenna module, wherein the die is a semiconductor-on-insulator (SOI) device with a RF circuit, and an integrated antenna substrate to provide an antenna for the RF circuit, wherein the die further includes a dielectric material layer in the form of a porous silicon substrate disposed between a semiconductor layer of the RF IC and the antenna substrate to support the formation of the antenna substrate and to control the clearance distance between the antenna elements and the RF circuit to control transmission losses.

In this regard, FIG. 4 is a side view of another exemplary die 400 that provides an integrated antenna module 402 integrated into the die 400 and that is capable of supporting higher frequency RF signals (e.g., D-band frequencies). However, the die 400 is not required to support RF signals of any particular frequency or frequency band. The die 400 can be provided as part of a single IC chip 409 that is fabricated as part of a wafer-level fabrication process as an example. Common elements between the die 400 in FIG. 4 and the die 200 in FIGS. 2A and 2B are shown with common elements numbers and will not be re-described. However, in the die 400 in FIG. 4, a dielectric material substrate 450 similar to the dielectric material substrate 250 in the die 200 in FIGS. 2A and 2B is provided as a porous silicon substrate to control its permittivity. For example, during fabrication of the die 400, a porosification process can be performed on the dielectric material substrate 450 as a silicon substrate to control and tune its permittivity and loss tangent to the desired levels to achieve the desired performance for the supported communication frequencies. Controlling the porosification of the dielectric material substrate 450 as a silicon substrate controls transmission losses between the antenna elements 208(1)-208(6) in the antenna substrate 210 and the RF IC 204. For example, the dielectric material substrate 450 as a porous silicon substrate may have a permittivity between 4 F/m and 6 F/m. As another example, the dielectric material substrate 450 as a porous silicon substrate may have a permittivity less than 6.0 F/m.

Also in this example of the die 400 in FIG. 4, to avoid damaging the semiconductor layer 218 when performing the porosification process to the dielectric material substrate 450 as a silicon substrate, an etch stop layer 452 (e.g., a Nitride layer) can be disposed on the dielectric material substrate 450 as a handle layer prior to forming the semiconductor layer 218 thereon. The etch stop layer 452 prevents the porosification of the semiconductor layer 218 when the silicon substrate is processed into a porous silicon layer.

Figure 5:
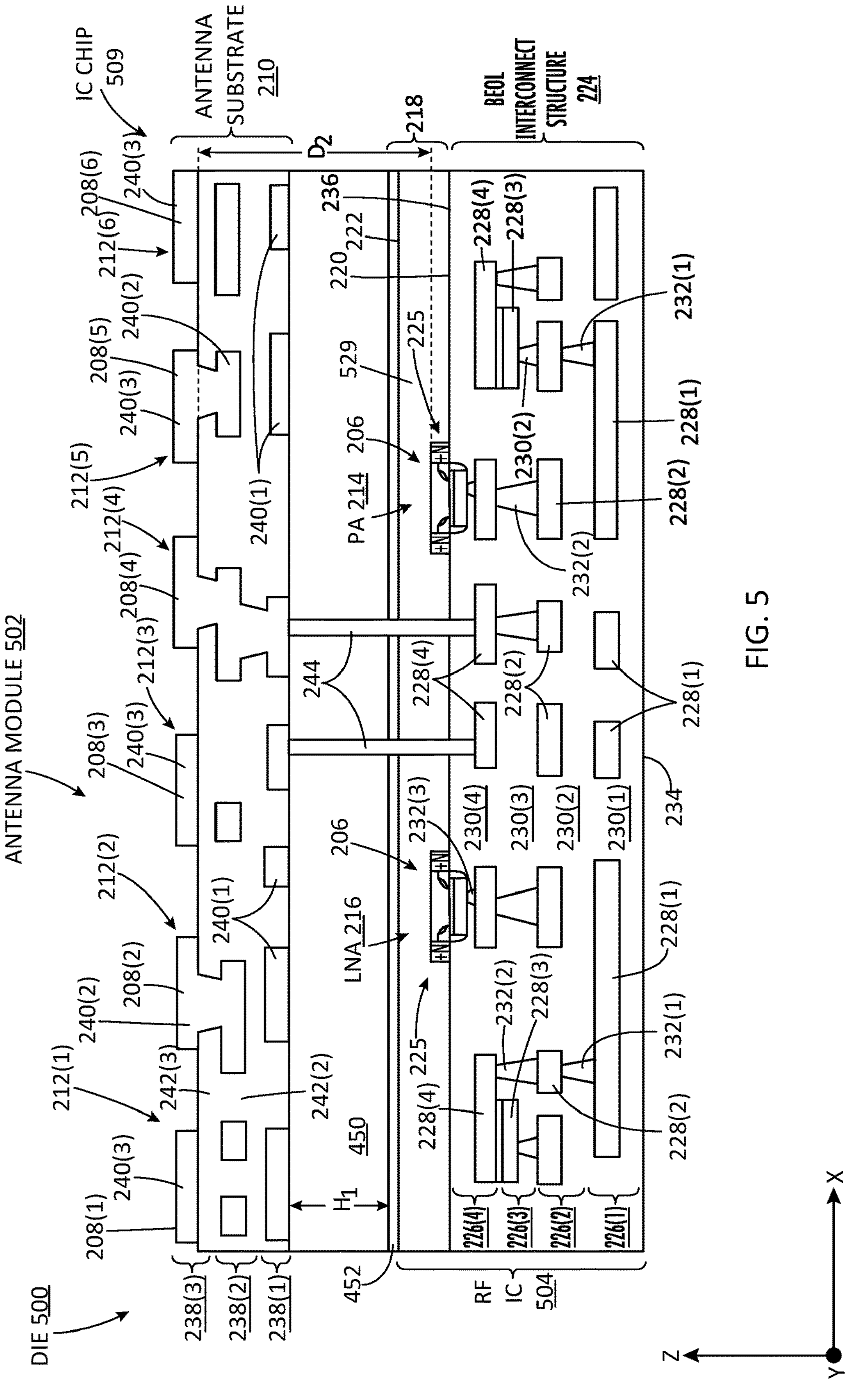
FIG. 5 is a side view of another exemplary die that provides an antenna module, wherein the die includes a bulk device with a RF circuit, and an integrated antenna substrate to provide an antenna for the RF circuit, wherein the die further includes a dielectric material layer disposed between a semiconductor layer of the RF IC and the antenna substrate to support the formation of the antenna substrate and to control the clearance distance between the antenna elements and the RF circuit to control transmission losses.

FIG. 5 is a side view of another exemplary die 500 that provides an integrated antenna module 502 integrated into the die 500 and that is capable of supporting higher frequency RF signals (e.g., D-band frequencies) similar to the die 400 in FIG. 4. The die 500 can be provided as part of a single IC chip 509 that is fabricated as part of a wafer-level fabrication process as an example. Common elements between the die 500 in FIG. 5 and the die 400 in FIG. 4 are shown with common elements numbers and will not be re-described. However, in the die 500 in FIG. 5, a RF IC 504 is included that is similar to the RF IC 204 in the die 400 in FIG. 4. However, the RF IC 504 in the die 500 in FIG. 5 is a bulk device and not a SOI device. In FIG. 5, the antenna substrate 210 of the die 500 is formed adjacent to a bulk semiconductor material layer as the dielectric material substrate 450 (e.g., bulk silicon substrate) such that the die 500 is a bulk device. In this regard, the BOX layer 227 in the die 400 in FIG. 4 is not present in the RF IC 504 in the die 500 in FIG. 5. The RF IC 504 includes the semiconductor substrate 529 (e.g., silicon substrate) adjacent to the back side 222 of the semiconductor layer 218. Also note that although the die 500 in FIG. 5 includes the dielectric material substrate 450 as a porous silicon substrate, such is not required. The dielectric material substrate 450 does not have to be a silicon substrate, and does not have to be a porous substrate.

Figure 6:
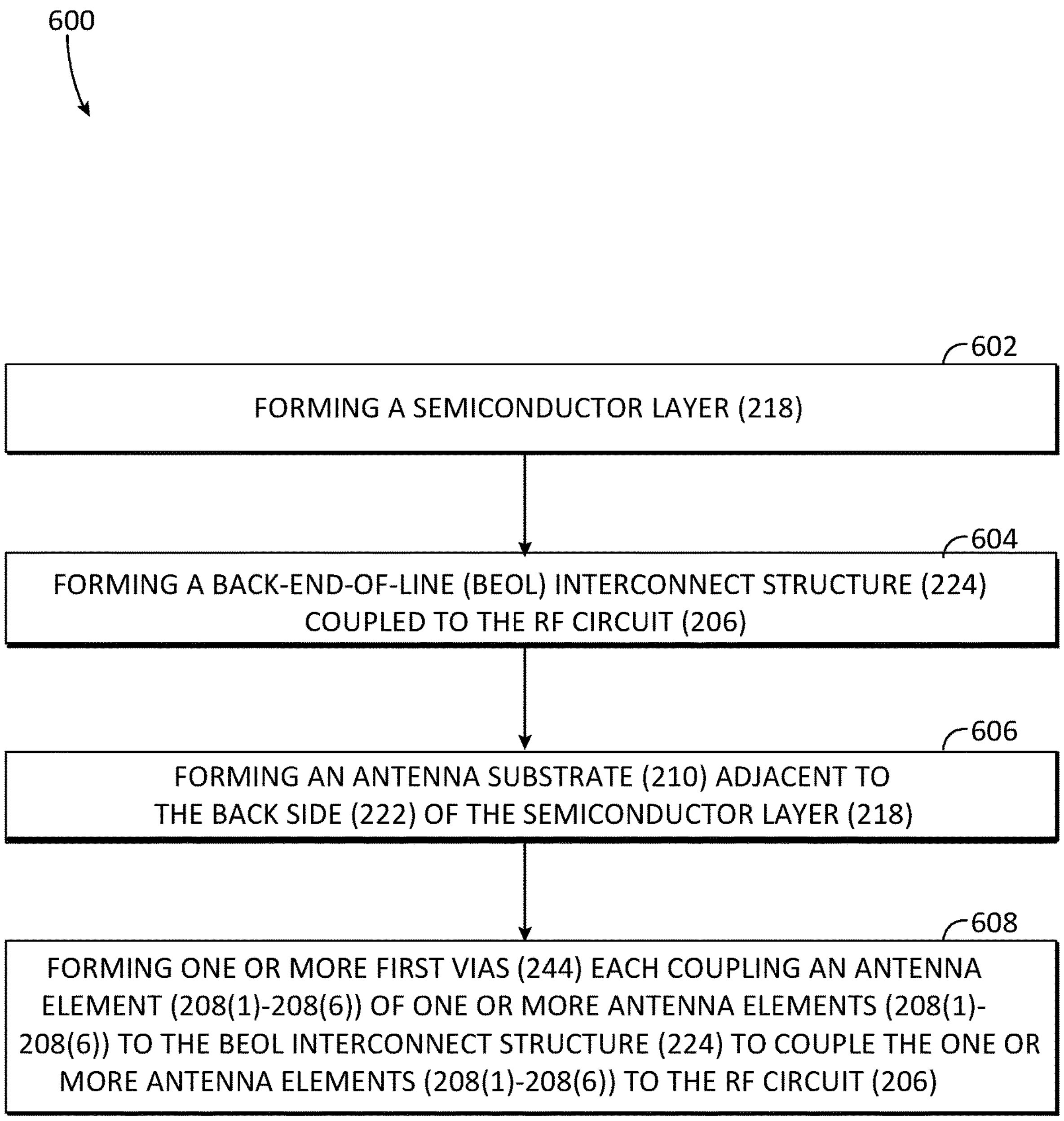
FIG. 6 is a flowchart illustrating an exemplary fabrication process for fabricating a die that provides an antenna module, wherein the die includes an RF IC with a RF circuit, and an integrated antenna substrate to provide an antenna for the RF circuit, wherein the antenna substrate is adjacent to the back side of the RF IC, including but not limited to the dies in FIGS. 2A-5.

There are various manners in which an antenna module that includes a die that provides an antenna module, wherein the die includes an RF IC with a RF circuit, and an integrated antenna substrate to provide an antenna for the RF circuit, wherein the antenna substrate is adjacent to the back side of the RF IC, including, but not limited to, the dies 200, 400, 500 in FIGS. 2A-5, can be formed and fabricated. In this regard, FIG. 6 is a flowchart illustrating an exemplary fabrication process 600 for fabricating such a die. The fabrication process 600 in FIG. 6 is discussed with regard to the die 200 in FIGS. 2A and 2B as an example, but such is not limiting.

In this regard, as shown in FIG. 6, the fabrication process 600 of forming the die 200 includes forming a semiconductor layer 218 (block 602 in FIG. 6) that includes the first side 220, the back side 222 opposite the first side 220, and a RF circuit 206. The fabrication process 600 also includes forming the BEOL interconnect structure 224 coupled to the RF circuit 206 for the die 200 (block 604 in FIG. 6). The BEOL interconnect structure 224 comprises the front side 234 and the second side 236 opposite the front side 234. The second side 236 of the BEOL interconnect structure 224 is adjacent to the semiconductor layer 218. The second side 236 of the BEOL interconnect structure 224 is coupled to the semiconductor layer 218 and also adjacent to the RF circuit 206 in this example. The fabrication process 600 of forming the die 200 can also include forming an antenna substrate 210 adjacent to the back side 222 of the semiconductor layer 218 (block 606 in FIG. 6). The fabrication process 600 of forming the die 200 can also include forming one or more first vias 244 each coupling an antenna element 208(1)-208(6) of one or more antenna elements 208(1)-208(6) to the BEOL interconnect structure 224 to couple the one or more antenna elements 208(1)-208(6) to the RF circuit 206 (block 608 in FIG. 6).

Other fabrication methods are also possible to fabricate a die that provides an antenna module, wherein the die includes an RF IC with a RF circuit, and an integrated antenna substrate to provide an antenna for the RF circuit, wherein the antenna substrate is adjacent to the back side of the RF IC. For example, FIGS. 7A-7E is a flowchart of another exemplary fabrication process 700 for fabricating a die like the dies 200, 400, 500 in FIGS. 2A-5, and according to exemplary fabrication stages 800A-800F in FIGS. 8A-8F, wherein the die is a SOI device with a RF circuit, and an integrated antenna substrate to provide an antenna for the RF circuit, wherein the die further includes a dielectric material layer disposed between a semiconductor layer of the RF IC and the antenna substrate to support the formation of the antenna substrate and to control the clearance distance between the antenna elements and the RF circuit to control transmission losses, including, but not limited to, the dies 200, 400, 500 in FIGS. 2A-5. The fabrication stages 800A-800F in FIGS. 8A-8F, according to the exemplary fabrication process 700 in FIGS. 7A-7E, will now be discussed in regard to the die 400 in FIG. 4 as a SOI device as a non-limiting example.

Figure 8A:
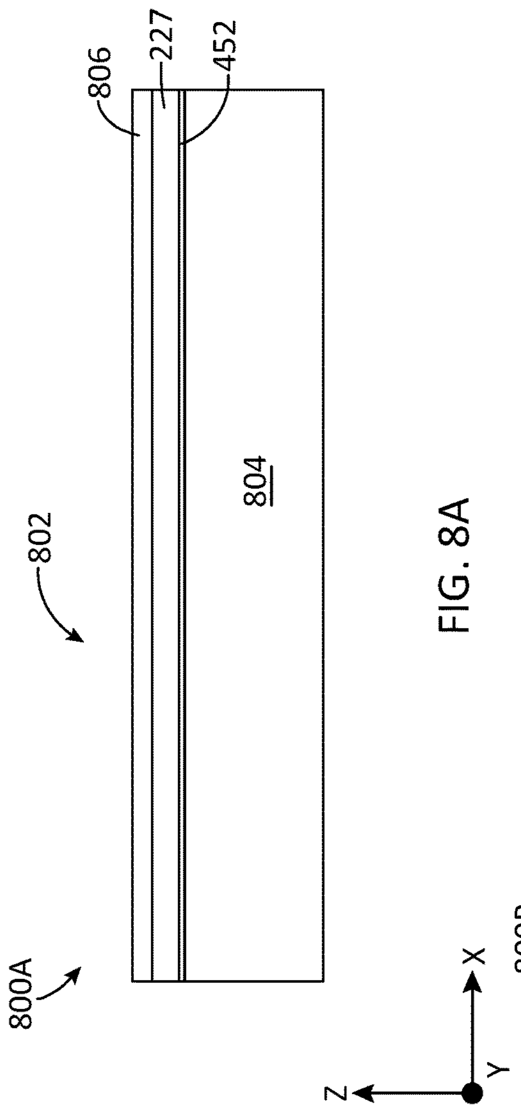
FIGS. 8A-8F illustrate exemplary fabrication stages during fabrication of the die fabricated according to the fabrication process in FIGS. 7A-7E.
Figure 7A:
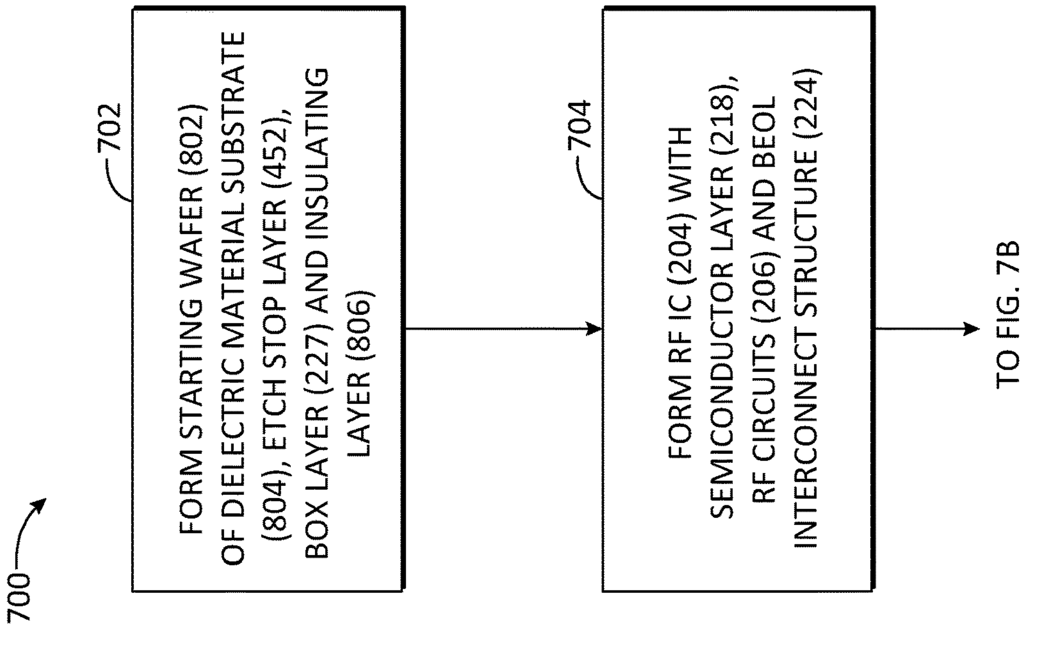
FIGS. 7A-7E is a flowchart illustrating another exemplary fabrication process for fabricating a die that provides an antenna module, wherein the die is a SOI device with a RF circuit, and an integrated antenna substrate to provide an antenna for the RF circuit, wherein the die further includes a dielectric material layer disposed between a semiconductor layer of the RF IC and the antenna substrate to support the formation of the antenna substrate and to control the clearance distance between the antenna elements and the RF circuit to control transmission losses, including, but not limited to, the dies in FIGS. 2A-5.

In this regard, as shown in the exemplary fabrication stage 800A in FIG. 8A, a first step in the fabrication process 700 is to provide a starting wafer 802 in which to process and build up on layers to form the die 400 (block 702 in FIG. 7A). Note that the starting wafer 802, after being fully processed after its layers are fully formed, will be diced into separate die, which will be like the die 400 in FIG. 4.

In this regard, as shown in the exemplary fabrication stage 800A in FIG. 8A, the fabrication process 700 includes forming a dielectric material substrate 804 (before it is processed to form dielectric material substrate 450 in FIG. 4), which may be a silicon substrate (block 702 in FIG. 7A). Also, as shown in the fabrication stage 800A in FIG. 8A, the etch stop layer 452 is formed on the dielectric material substrate 804 (block 702 in FIG. 7A). As previously discussed, the etch stop layer 452 is to protect the RF IC 204 from being damaged during the porosification of the dielectric material substrate 804 in a later processing step to control its permittivity. For example, the etch stop layer 452 may be formed of silicon nitride. As an example, the etch stop layer 452 may be 1000 Angstrom (Å) in thickness. Also, as shown in the fabrication stage 800A in FIG. 8A, the semiconductor layers in the form of the BOX layer 227 and an insulator layer 806 are formed on the etch stop layer 452 as part of the semiconductor layer 218 to be formed to form active components (block 702 in FIG. 7A).

Figure 8B:
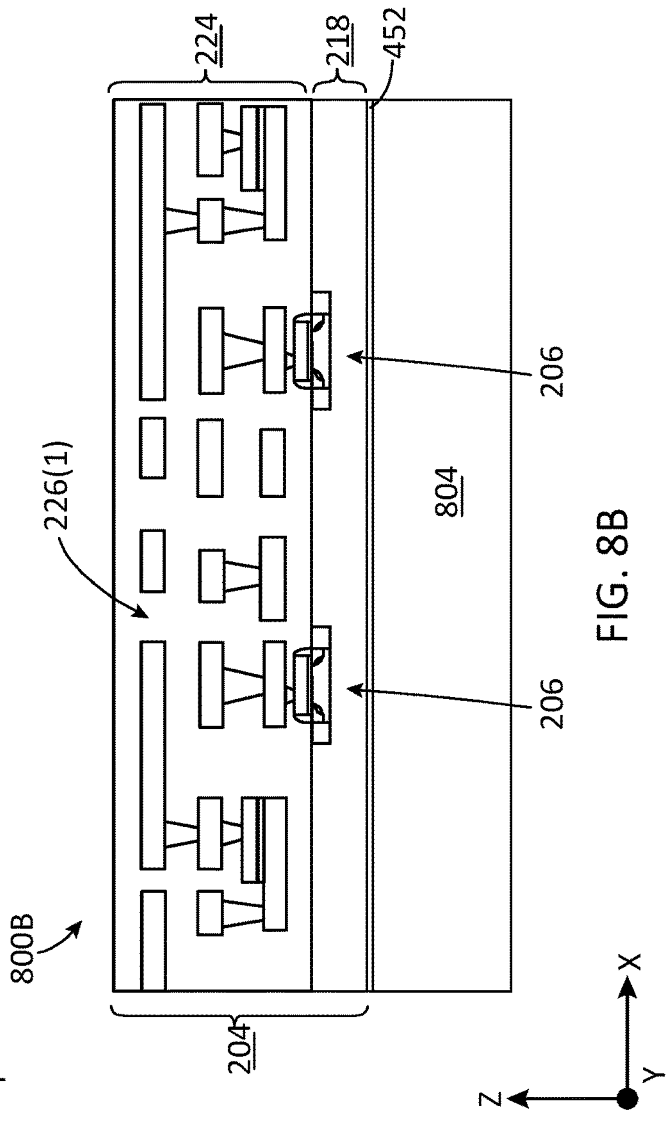

Then, as shown in the exemplary fabrication stage 800B in FIG. 8B, the semiconductor layer 218 of the RF IC 204 is formed as part of a FEOL fabrication process (block 704 in FIG. 7A). The RF circuits 206 are formed in the semiconductor layer 218 (block 704 in FIG. 7A). The BEOL interconnect structure 224 is also formed as part of a BEOL fabrication process adjacent to the semiconductor layer 218 to form the RF IC 204 (block 704 in FIG. 7A). This process is part of a CMOS fabrication process in this example.

Figure 8C:
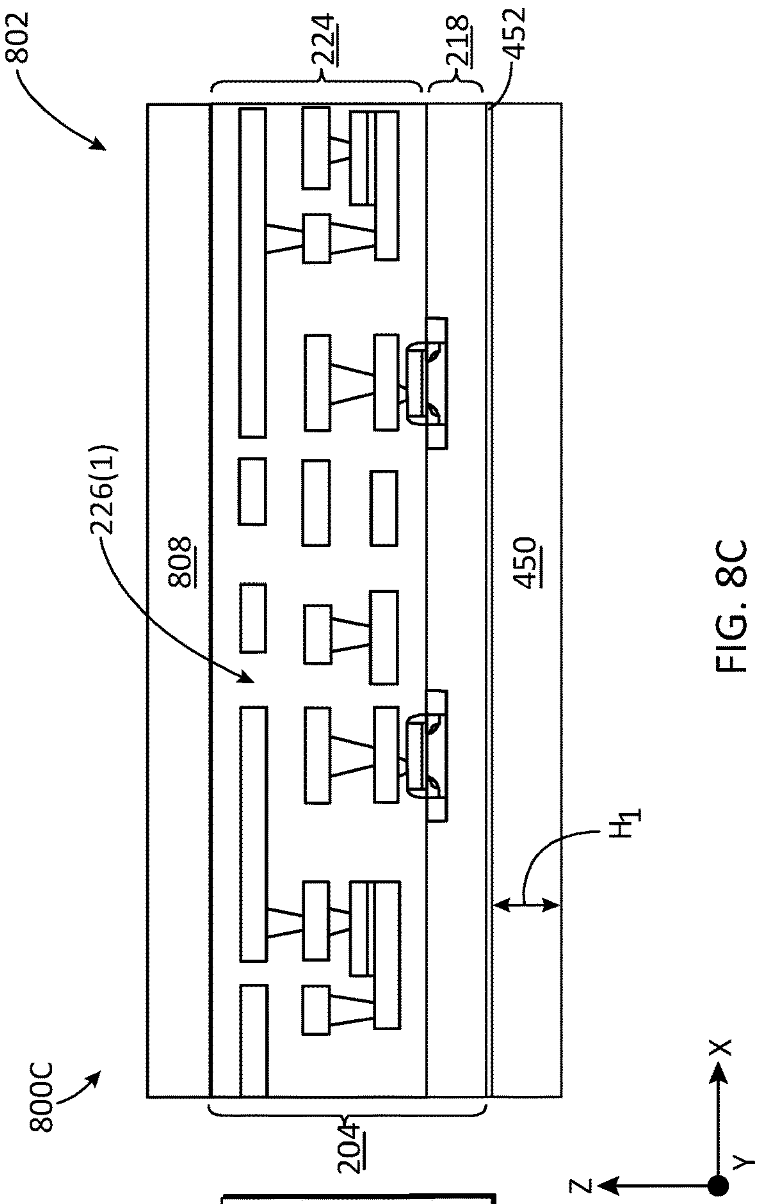
Figure 7B:
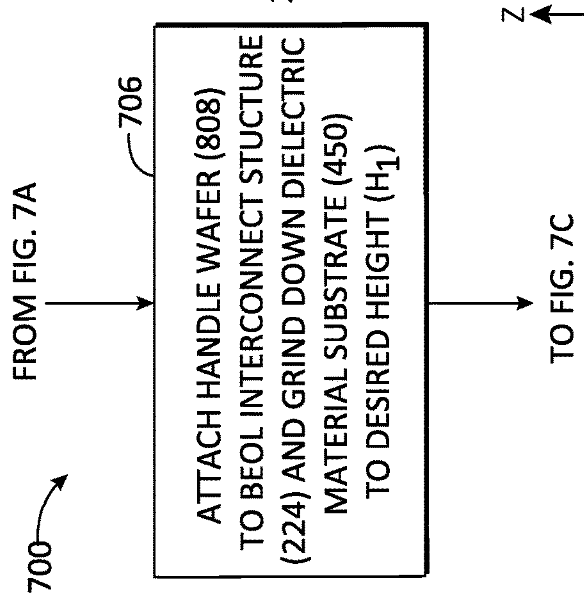
Figure 8D:
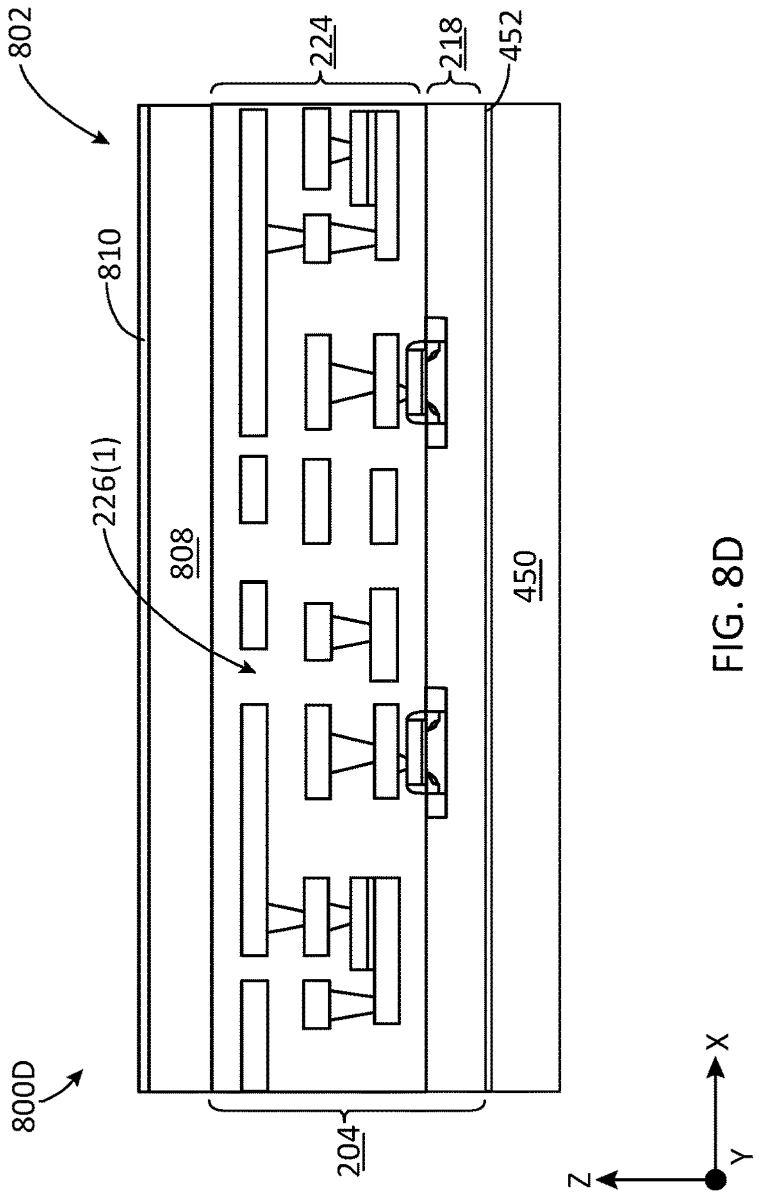
Figure 7C:
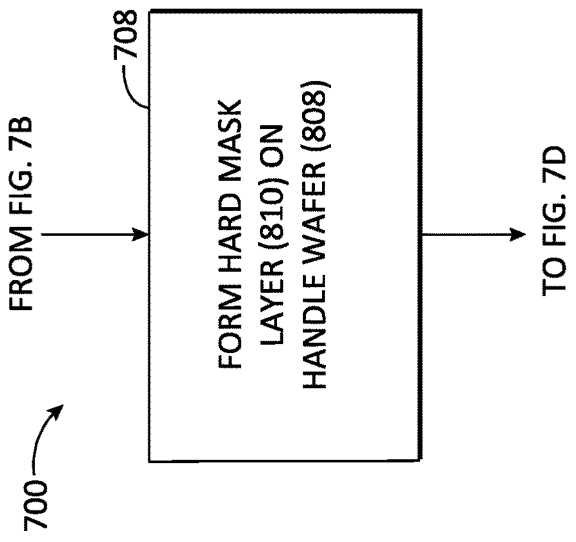

Then, as shown in the exemplary fabrication stage 800C in FIG. 8C, a temporary handle wafer 808 ("handle wafer 808") is attached to the RF IC 204 adjacent to the BEOL interconnect structure 224 (block 706 in FIG. 7B). This is so the starting wafer 802 can be handled to process the dielectric material substrate 450 to control its ultimate first height $H_1$ to control the clearance distance between the RF circuits 206 and the antenna elements 208(1)-208(6) in the antenna substrate 210 to be integrated as part of a die 400. For example, the dielectric material substrate 450 can be ground down to control its ultimate first height $H_1$ (block 706 in FIG. 7B). As an example, the dielectric material substrate 450 may be ground down such that its first height $H_1$ is between 50-60 μm. Then, as shown in the exemplary fabrication stage 800D in FIG. 8D, a hard mask layer 810 is formed on the handle wafer 808 (block 708 in FIG. 7C) to protect the starting wafer 802 when the dielectric material substrate 450 is later subjected to a porosification process to make the dielectric material substrate 450 porous (e.g., a porous silicon) to control its permittivity. For example, the hard mask layer 810 may be a low-pressure chemical vapor deposition (LPCVD) silicon nitride layer.

Figure 7D:
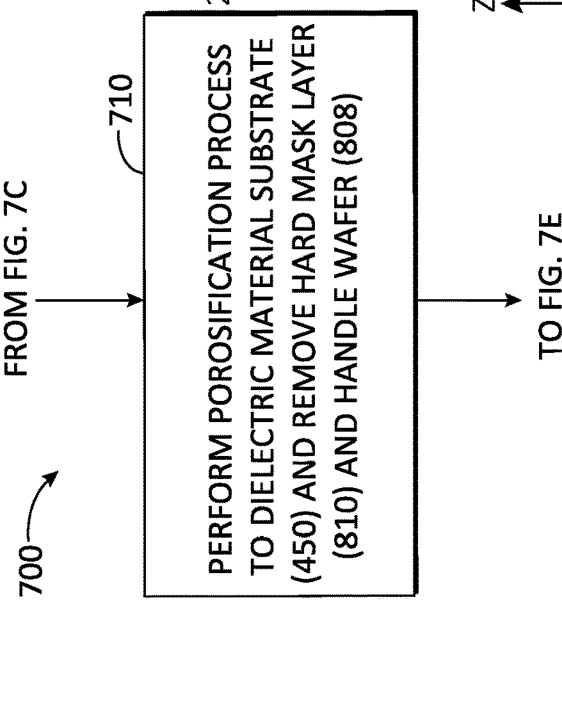
Figure 8E:
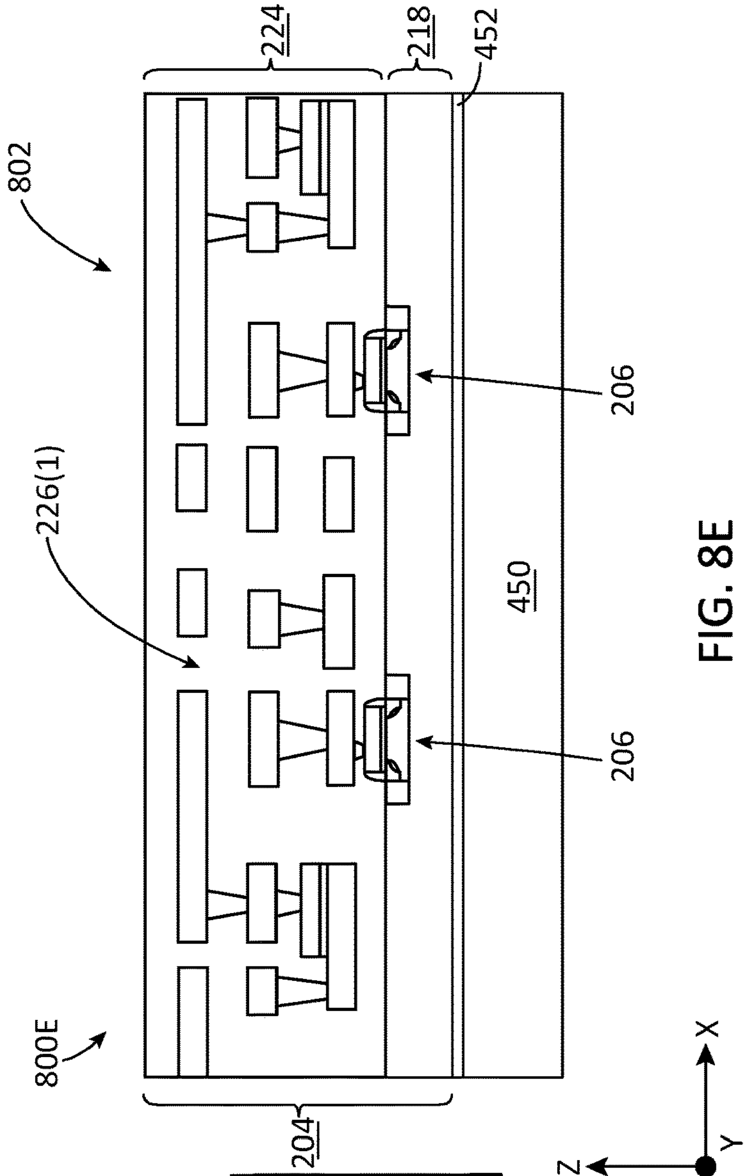

Then, as shown in the exemplary fabrication stage 800E in FIG. 8E, a porosification process is performed on the dielectric material substrate 450 to make the dielectric material substrate 450 a porous substrate to control its permittivity (block 710 in FIG. 7D). The amount of porosity added to the dielectric material substrate 450 controls its permittivity. For example, the dielectric material substrate 450 may be converted into a porous substrate by subjecting the dielectric material substrate 450 to an electrolytic etch process in hydrofluoric (HF) acid with ethanol. The electrolytic etch stops at the etch stop layer 452. Also, as shown in fabrication stage 800E in FIG. 8E, the hard mask layer 810 and handle wafer 808 are removed (block 710 in FIG. 7D).

Figure 8F:
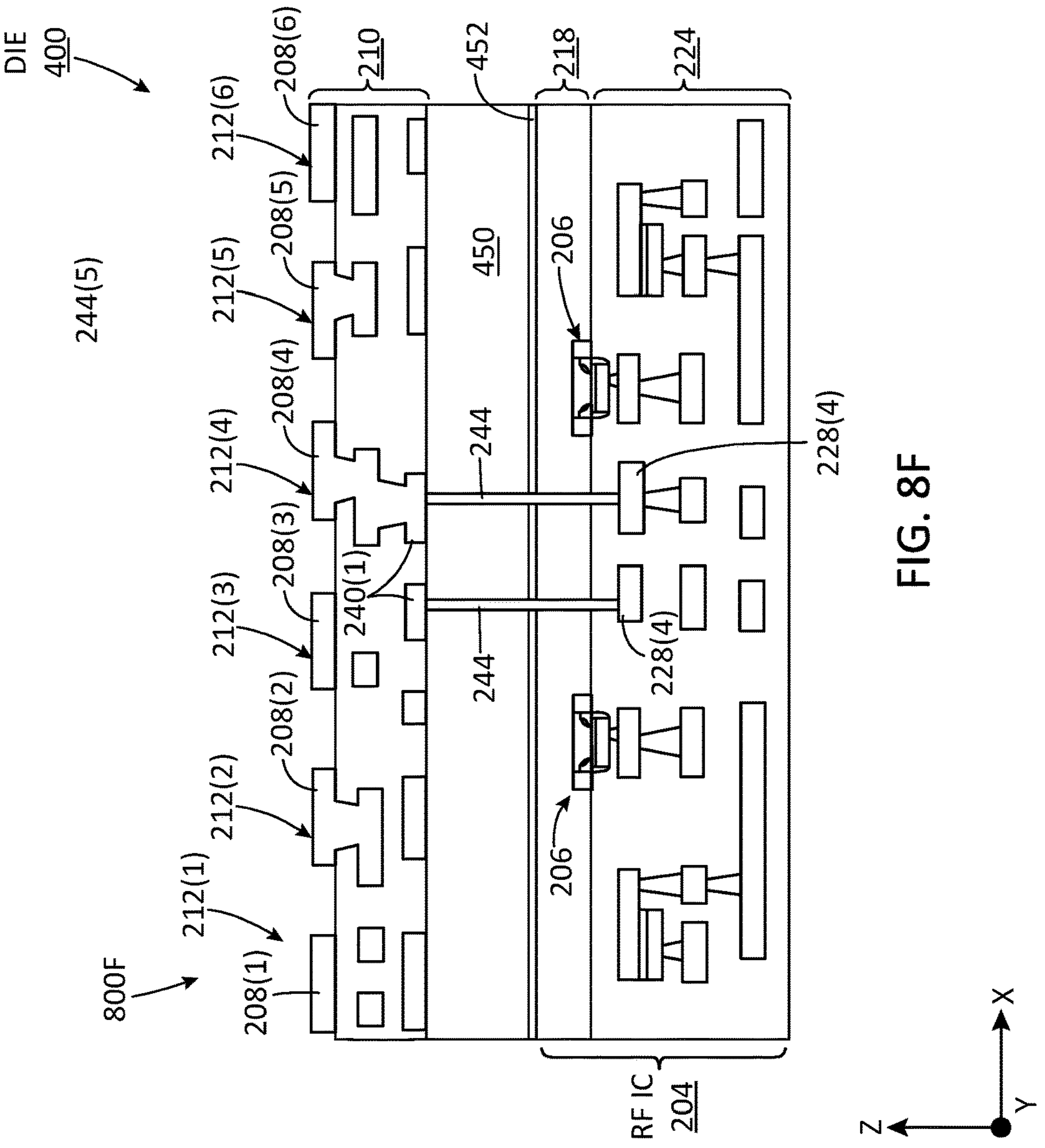
Figure 7E:
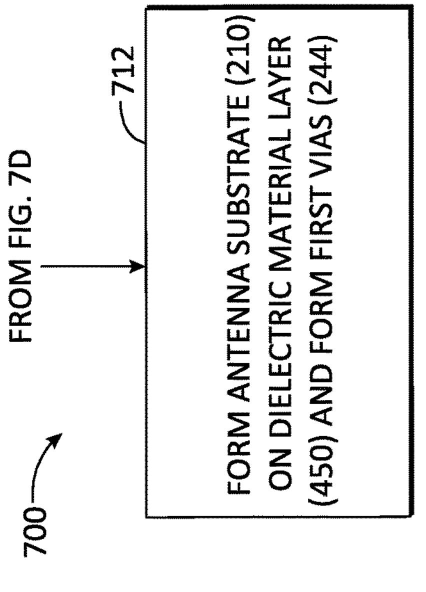

Then, as shown in exemplary fabrication stage 800F in FIG. 8F, the antenna substrate 210 is formed on the dielectric material substrate 450 (block 712 in FIG. 7E). The antenna substrate 210 may be built on the dielectric material substrate 450 in separate antenna layers 238(1)-238(3) (see FIG. 4) which may be RDL layers as previously described. The antenna layers 238(1)-238(3) may formed and built-up as RDL layers on a photo-polyimide material on the dielectric material substrate 450. The antenna elements 208(1)-208(6) are formed in the first antenna layer 238(3). Also, as shown in the exemplary fabrication stage 800F in FIG. 8F, the first vias 244 are formed through the dielectric material substrate 450, the etch stop layer 452, and the RF IC 204 to couple metal interconnects 240(1) in the antenna layer 238(1) to the metal interconnects 228(4) in the BEOL interconnect structure 224 (block 712 in FIG. 7E). As an example, the first vias 244 may be formed by a drilling process. The first vias 244 provide signal routing paths between the antenna elements 208(1)-208(6) in the antenna substrate 210 and the BEOL interconnect structure 224 to then provide these signal routing paths to the RF circuits 206 in the RF IC 204.

FIGS. 9A-9E is a flowchart of another exemplary fabrication process 900 for fabricating a die like the die 500 as a bulk device in FIG. 5, and according to exemplary fabrication stages 1000A-1000F in FIGS. 10A-10F. The fabrication stages 1000A-1000F in FIGS. 10A-10F, according to the exemplary fabrication process 900 in FIGS. 9A-9E will now be discussed in regard to the die 500 in FIG. 5 as a non-limiting example.

Figure 10A:
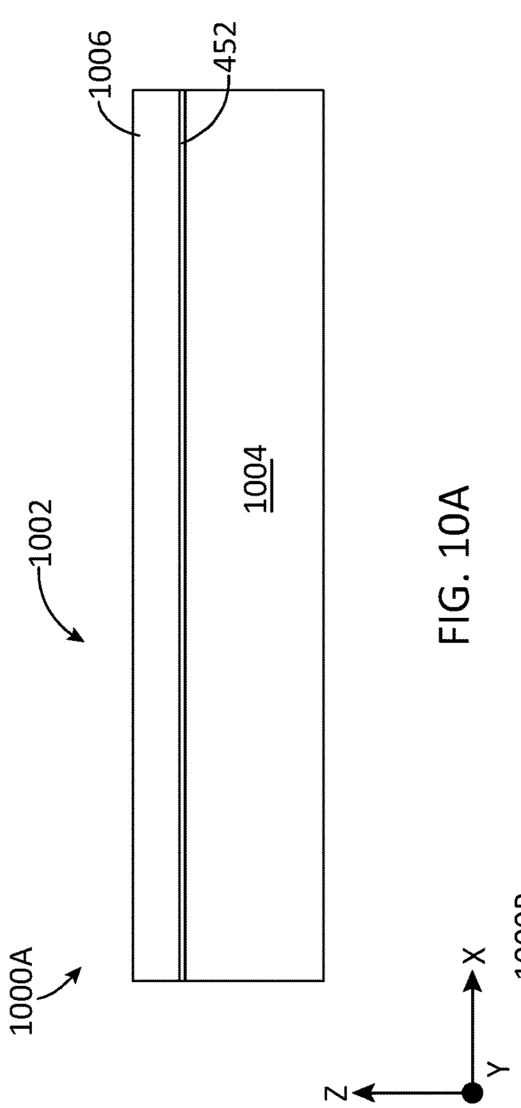
FIGS. 10A-10F illustrate exemplary fabrication stages during fabrication of the die fabricated according to the fabrication process in FIGS. 9A-9E.
Figure 9A:
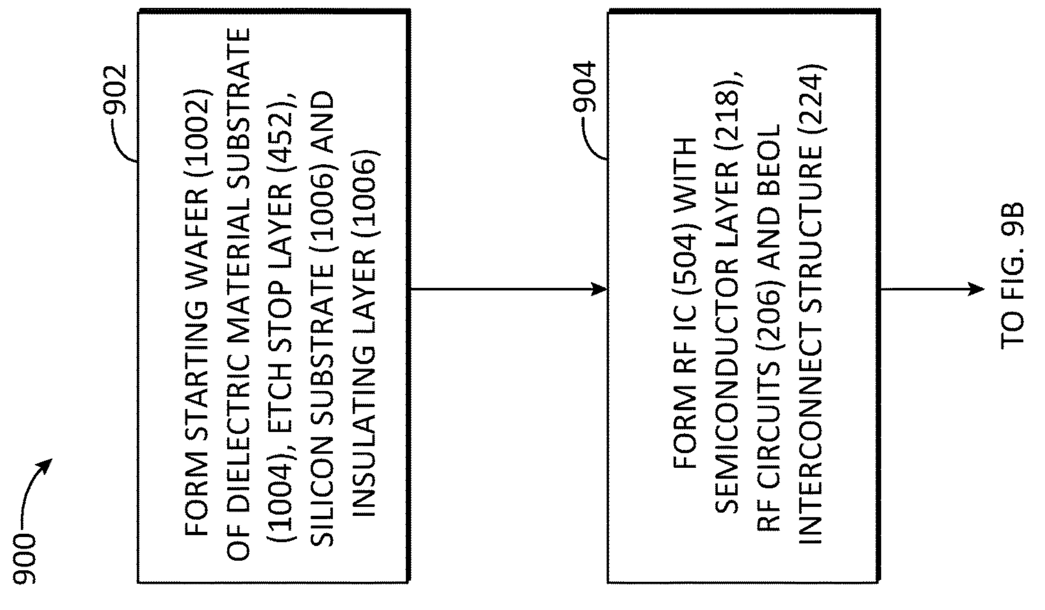
FIGS. 9A-9E is a flowchart illustrating another exemplary fabrication process for fabricating a die that provides an antenna module, wherein the die includes a bulk device with a RF circuit, and an integrated antenna substrate to provide an antenna for the RF circuit, wherein the die further includes a dielectric material layer disposed between a semiconductor layer of the RF IC and the antenna substrate to support the formation of the antenna substrate and to control the clearance distance between the antenna elements and the RF circuit to control transmission losses, including, but not limited to, the dies in FIGS. 2A-5.

In this regard, as shown in the exemplary fabrication stage 1000A in FIG. 10A, a first step in the fabrication process 900 is to provide a starting wafer 1002 in which to process and build up on layers to form the die 500 (block 902 in FIG. 9A). Note that that the starting wafer 1002, after being fully processed after its layers are fully formed, will be diced into separate die, which will be like the die 500 in FIG. 5. As shown in the exemplary fabrication stage 1000A in FIG. 10A, the fabrication process 900 includes forming a dielectric material substrate 1004, which may be a silicon substrate (block 902 in FIG. 9A). Also, as shown in the fabrication stage 1000A in FIG. 10A, the etch stop layer 452 is formed on the dielectric material substrate 1004 (block 902 in FIG. 9A). As previously discussed, the etch stop layer 452 is to protect the RF IC 504 from being damaged during the porosification of the dielectric material substrate 1004 in a later processing step to control its permittivity. For example, the etch stop layer 452 may be formed of silicon nitride. As an example, the etch stop layer 452 may be 1000 Å in thickness. Also, as shown in the fabrication stage 1000A in FIG. 10A, the semiconductor layers in the form of a silicon substrate 1006 is formed on the etch stop layer 452 as part of the semiconductor layer 218 to be formed to form active components (block 902 in FIG. 9A).

Figure 10B:
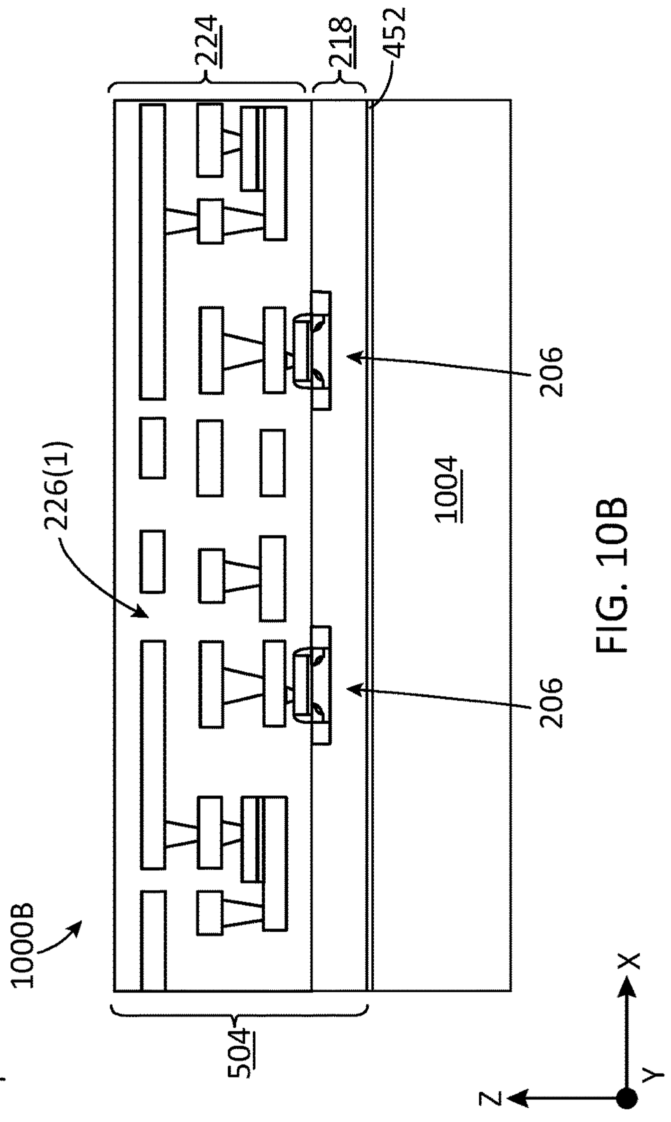

Then, as shown in the exemplary fabrication stage 1000B in FIG. 10B, the semiconductor layer 218 of the RF IC 504 is formed as part of a FEOL fabrication process (block 904 in FIG. 9A). The RF circuits 206 are formed in the semiconductor layer (block 904 in FIG. 9A). The BEOL interconnect structure 224 is also formed as part of a BEOL fabrication process adjacent to the semiconductor layer 218 to form the RF IC 504 (block 904 in FIG. 9A). This process is part of a CMOS fabrication process in this example.

Figure 10C:
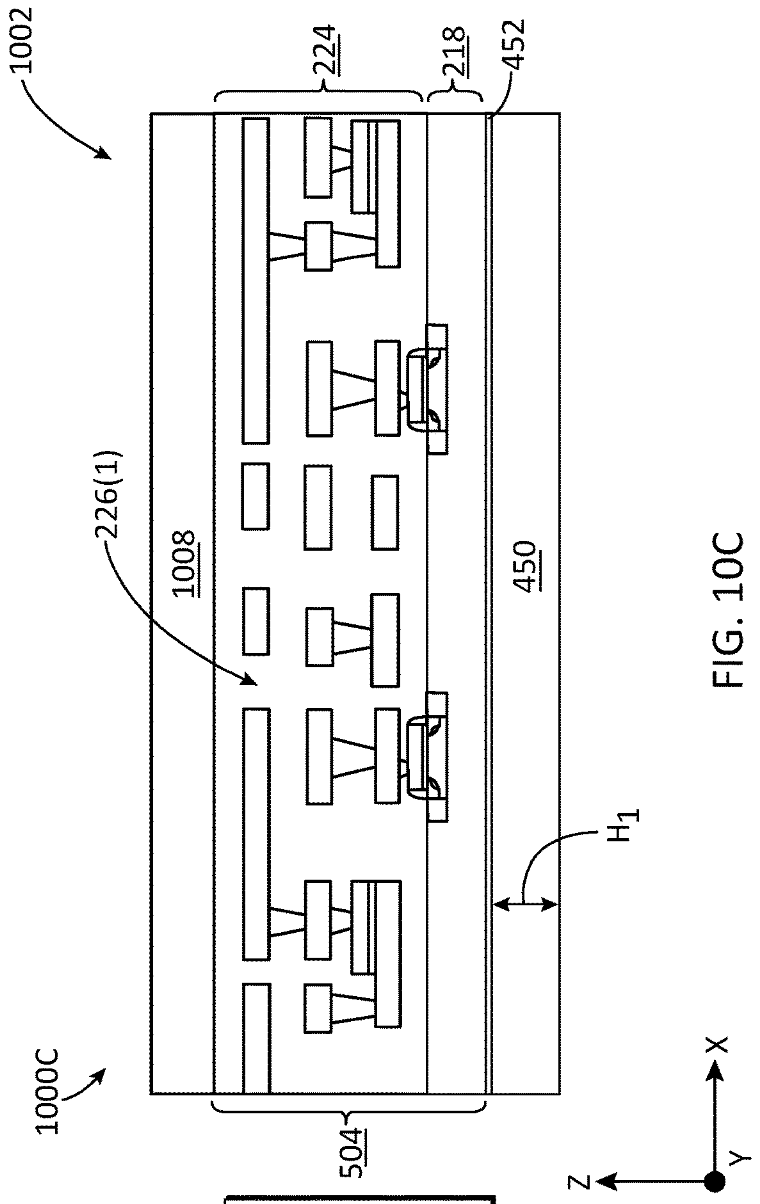
Figure 9B:
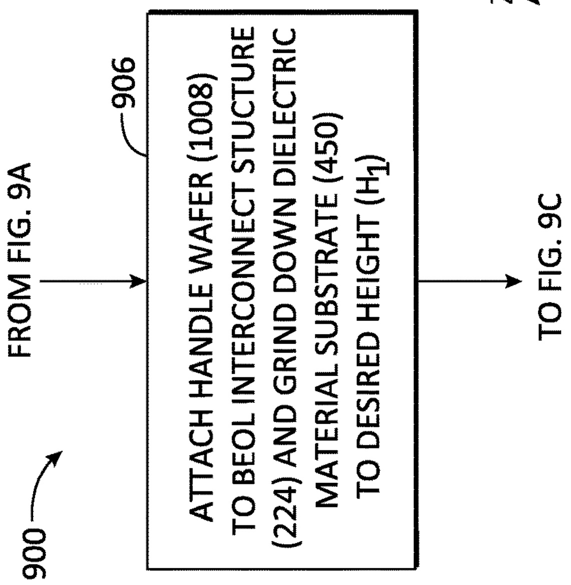

Then, as shown in the exemplary fabrication stage 1000C in FIG. 10C, a temporary handle wafer 1008 ("handle wafer 1008") is attached to the RF IC 504 adjacent to the BEOL interconnect structure 224 (block 906 in FIG. 9B). This is so the starting wafer 1002 can be handled to process the dielectric material substrate 450 to control its ultimate first height $H_1$ to control the clearance distance between the RF circuits 206 and the antenna elements 208(1)-208(6) in the antenna substrate 210 to be integrated as part of the die 500. For example, the dielectric material substrate 450 can be ground down to control its ultimate first height $H_1$ (block 906 in FIG. 9B). As an example, the dielectric material substrate 450 may be ground down such that its first height $H_1$ is between 50-60 μm.

Figure 10D:
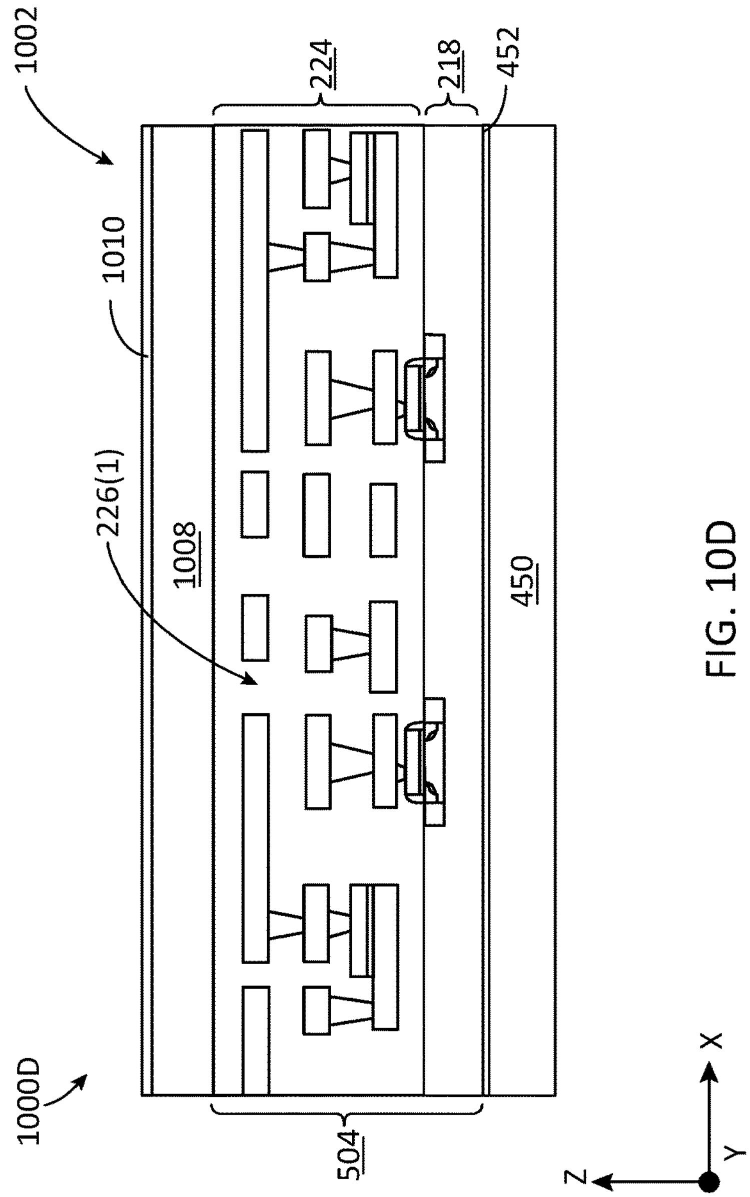
Figure 9C:
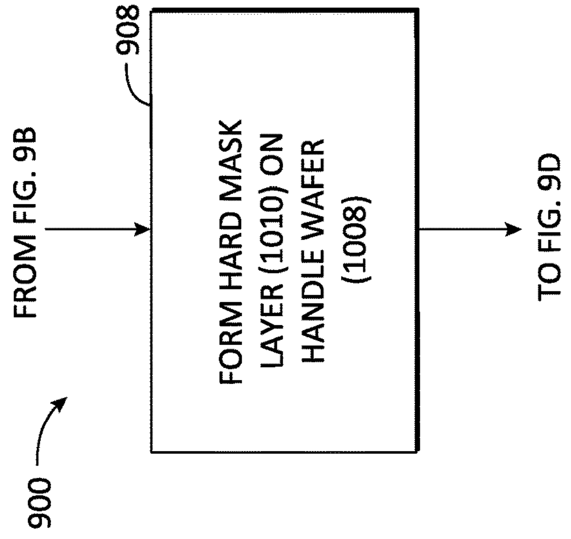

Then, as shown in the exemplary fabrication stage 1000D in FIG. 10D, a hard mask layer 1010 is formed on the handle wafer 1008 (block 908 in FIG. 9C) to protect the starting wafer 1002 when the dielectric material substrate 450 is later subjected to a porosification process to make the dielectric material substrate 450 porous (e.g., a porous silicon) to control its permittivity. For example, the hard mask layer 1010 may be a low-pressure chemical vapor deposition LPCVD silicon nitride layer.

Figure 10E:
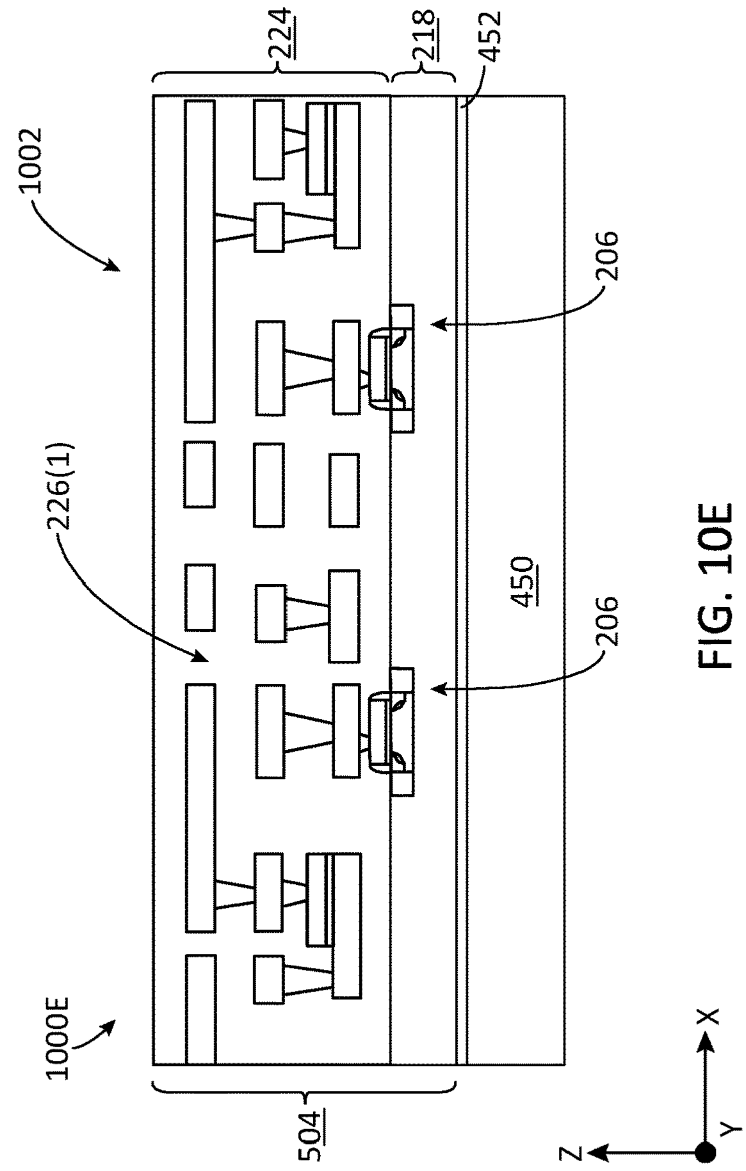
Figure 9D:
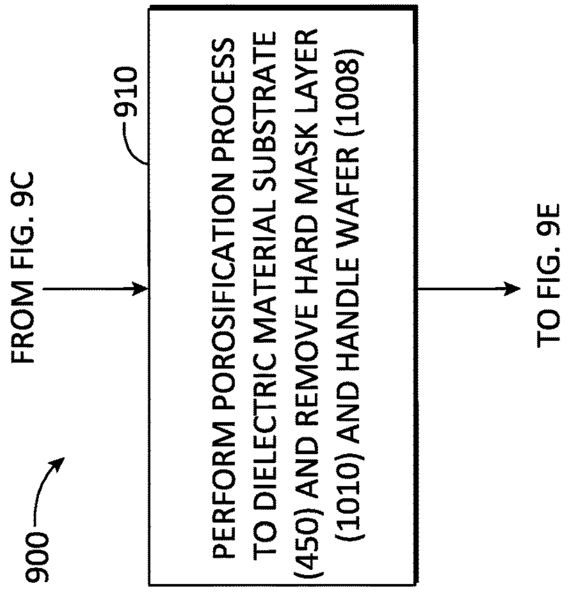

Then, as shown in the exemplary fabrication stage 1000E in FIG. 10E, a porosification process is performed on the dielectric material substrate 450 to make the dielectric material substrate 450 a porous substrate to control its permittivity (block 910 in FIG. 9D). The amount of porosity added to the dielectric material substrate 450 controls its permittivity. For example, the dielectric material substrate 450 may be converted into a porous substrate by subjecting the dielectric material substrate 450 to an electrolytic etch process in hydrofluoric (HF) acid with ethanol. The electrolytic etch stops at the etch stop layer 452. Also, as shown in fabrication stage 1000E in FIG. 10E, the hard mask layer 1010 and handle wafer 1008 are removed (block 910 in FIG. 9D).

Figure 10F:
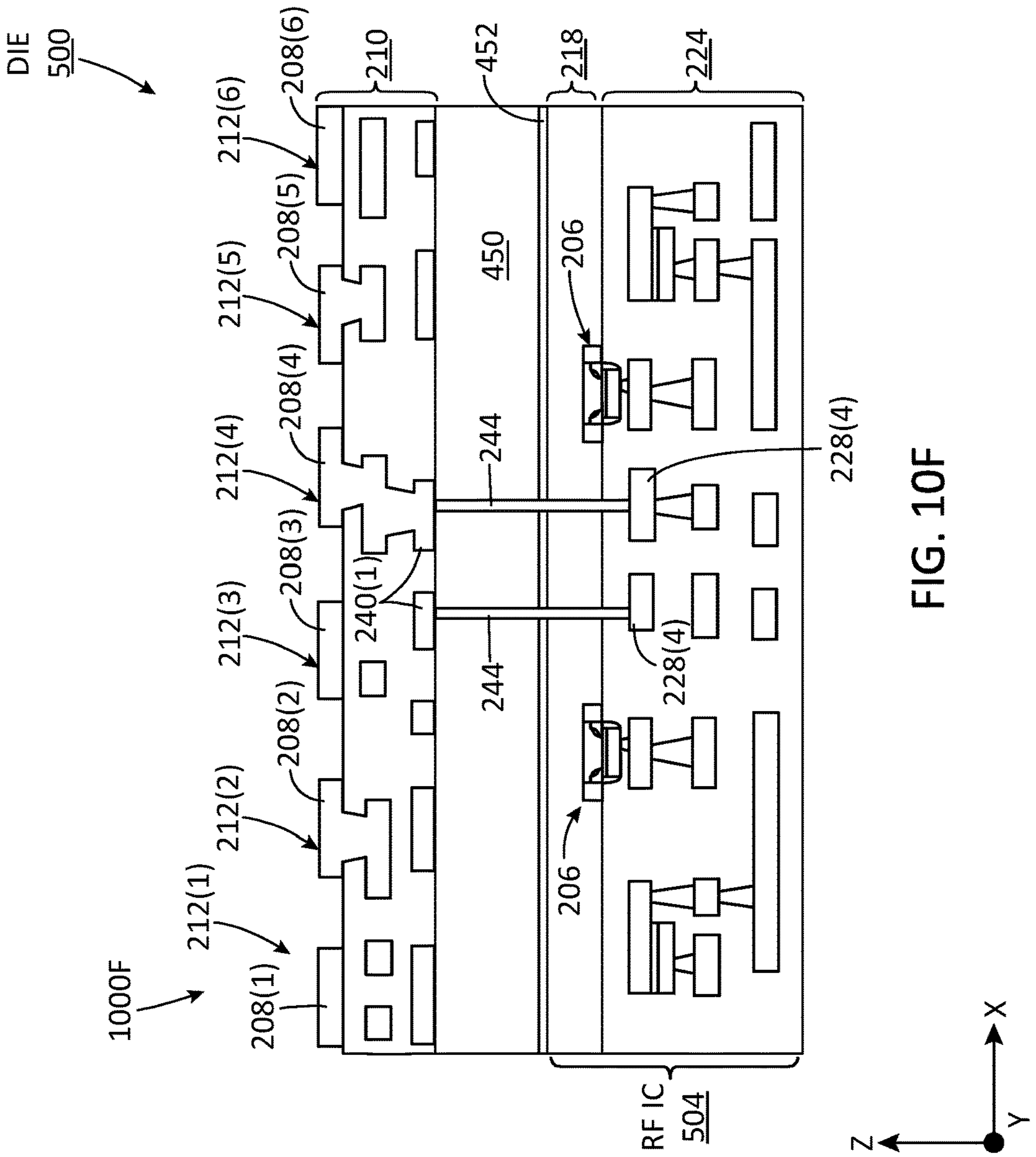
Figure 9E:
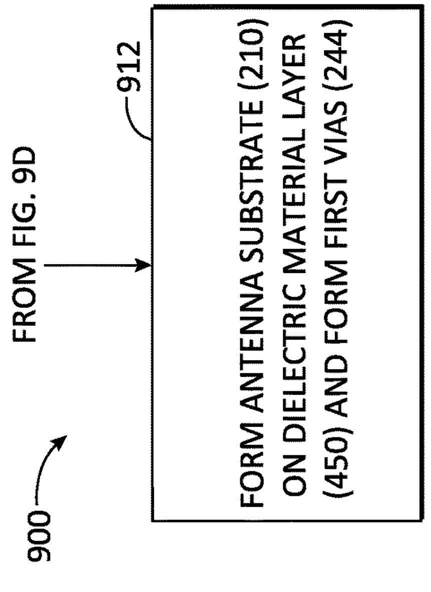

Then, as shown in exemplary fabrication stage 1000F in FIG. 10F, the antenna substrate 210 is formed on the dielectric material substrate 450 (block 912 in FIG. 9E). The antenna substrate 210 may be built on the dielectric material substrate 450 in separate antenna layers 238(1)-238(3) (shown in FIG. 5) which may be RDL layers as previously described. The antenna layers 238(1)-238(3) may formed and built-up as RDL layers on a photo-polyimide material on the dielectric material substrate 450. The antenna elements 208(1)-208(6) are formed in the first antenna layer 238(3). Also, as shown in the exemplary fabrication stage 1000F in FIG. 10F, the first vias 244 are formed through the dielectric material substrate 450, the etch stop layer 452, and the RF IC 504 to couple metal interconnects 240(1) in the antenna layer 238(1) to the metal interconnects 228(4) in the BEOL interconnect structure 224 (block 912 in FIG. 9E). As an example, the first vias 244 may be formed by a drilling process. The first vias 244 provide signal routing paths between the antenna elements 208(1)-208(6) in the antenna substrate 210 and the BEOL interconnect structure 224 to then provide these signal routing paths to the RF circuits 206 in the RF IC 504.

Note that examples of the dies 200, 400, 500 in FIGS. 2A-5, 8F and 10F discussed above reference their respective antennas 212 being capable of supporting particular exemplary frequencies and/or frequency bands, including in the D-band frequency spectrum. Note that the antennas 212 are not so limited. The antennas 212 formed in the dies 200, 400, 500 in FIGS. 2A-5, 8F and 10F and/or any other die that provides an antenna module, wherein the die includes an RF IC with a RF circuit, and an integrated antenna substrate to provide an antenna for the RF circuit, can be designed and fabricated to support any frequencies and/or frequency spectrum desired, including without limitation frequency spectrum in 5G and 6G bands and lower and higher.

An object being "adjacent" as discussed herein relates to an object being beside or next to another stated object. Adjacent objects may not be directly physically coupled to each other. An object can be directly adjacent to another object which means that such objects are directly beside or next to the other object without another object or layer being intervening or disposed between the directly adjacent objects. An object can be indirectly or non-directly adjacent to another object which means that such objects are not directly beside or directly next to each other, but there is an intervening object or layer disposed between the non-directly adjacent objects.

A die that provides an antenna module, wherein the die includes an RF IC with a RF circuit, and an integrated antenna substrate to provide an antenna for the RF circuit, wherein the die further includes a dielectric material layer disposed between a semiconductor layer of the RF IC and the antenna substrate to support the formation of the antenna substrate and to control the clearance distance between the antenna elements and the RF circuit to control transmission losses, including, but not limited to, the dies 200, 400, 500 in FIGS. 2A-5, 8F and 10F, and that can be fabricated according to any of the exemplary fabrication processes 600, 700, 900 in FIGS. 6, 7A-7E, and 9A-9E, may be provided in or integrated into any wireless communication device and/or processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SiP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 11:
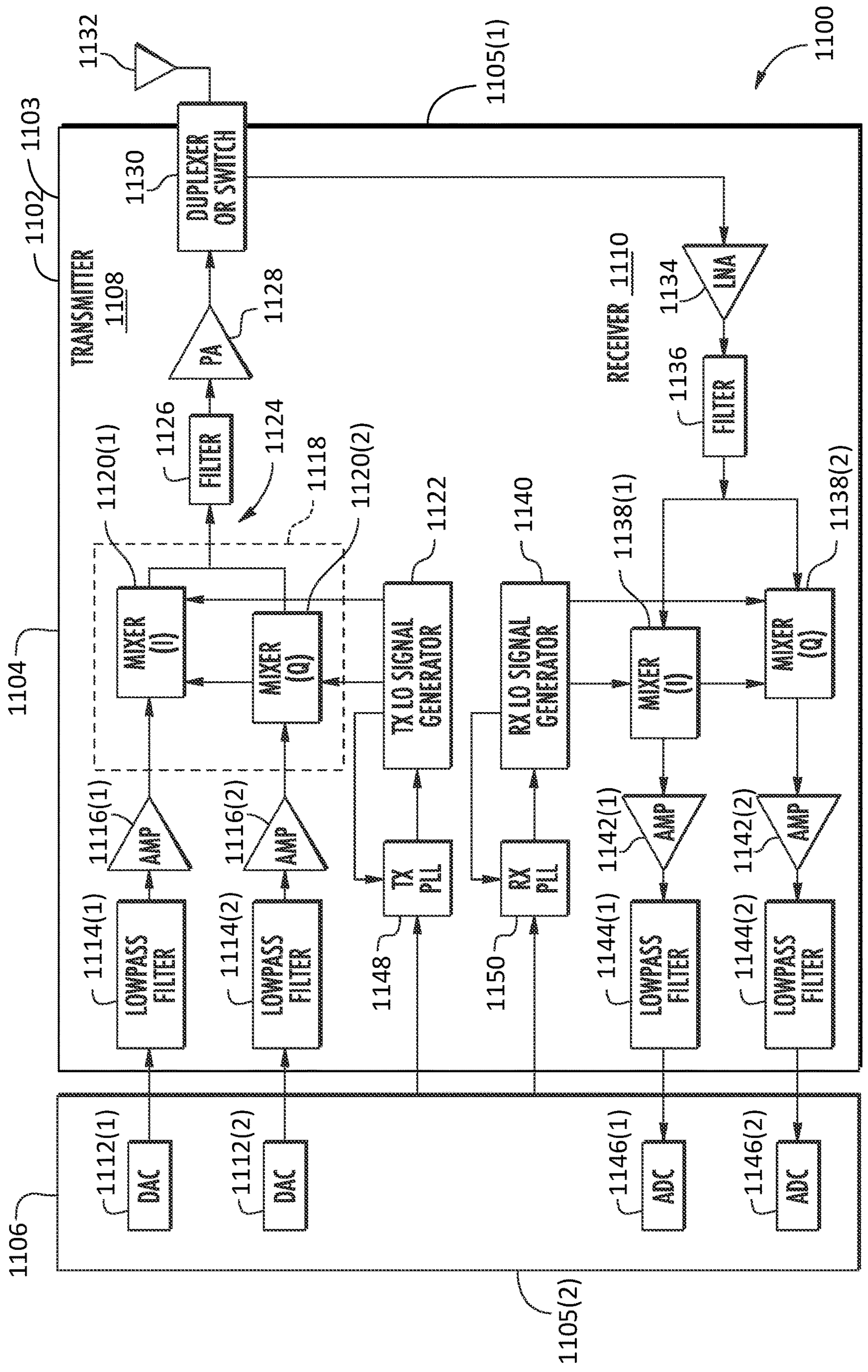
FIG. 11 is a block diagram of an exemplary wireless communications device that includes a die that provides an antenna module, wherein the die includes a RF IC with a RF circuit, and an integrated antenna substrate to provide an antenna for the RF circuit, wherein the antenna substrate is adjacent to the back side of the RF IC, including, but not limited to, the dies in FIGS. 2A-5, 8F, and 10F, and that can be fabricated according to any of the exemplary fabrication processes in FIGS. 6, 7A-7E, and 9A-9E.

FIG. 11 illustrates an exemplary wireless communications device 1100 that includes an antenna module 1102. The antenna module 1102 is provided in the form of a die 1103 that includes an RF IC with a RF circuit, and an integrated antenna substrate to provide an antenna for the RF circuit, wherein the antenna substrate is adjacent to the back side of the RF IC. The die 1103 can include the dies 200, 400, 500 in FIG. 2A-5, 8F, or 10F, and be fabricated according to any of the fabrication processes 600, 700, 900 in FIG. 6, 7A-7E, or 9A-9E, as non-limiting examples. As shown in FIG. 11, the wireless communications device 1100 includes a RF transceiver 1104 and a data processor 1106. The components of the RF transceiver 1104 and/or data processor 1106 can be split among multiple different die 1105(1), 1105(2). The data processor 1106 may include a memory to store data and program codes. The RF transceiver 1104 includes a transmitter 1108 and a receiver 1110 that support bi-directional communications. In general, the wireless communications device 1100 may include any number of transmitters 1108 and/or receivers 1110 for any number of communication systems and frequency bands. All or a portion of the RF transceiver 1104 may be implemented on one or more analog ICs. RF ICs, mixed-signal ICs, etc.

The transmitter 1108 or the receiver 1110 may be implemented with a super-heterodyne architecture or a direct-conversion architecture. In the super-heterodyne architecture, a signal is frequency-converted between RF and baseband in multiple stages, e.g., from RF to an intermediate frequency (IF) in one stage, and then from IF to baseband in another stage for the receiver 1110. In the direct-conversion architecture, a signal is frequency-converted between RF and baseband in one stage. The super-heterodyne and direct-conversion architectures may use different circuit blocks and/or have different requirements. In the wireless communications device 1100 in FIG. 11, the transmitter 1108 and the receiver 1110 are implemented with the direct-conversion architecture.

In the transmit path, the data processor 1106 processes data to be transmitted and provides I and Q analog output signals to the transmitter 1108. In the exemplary wireless communications device 1100, the data processor 1106 includes digital-to-analog converters (DACs) 1112(1), 1112 (2) for converting digital signals generated by the data processor 1106 into the I and Q analog output signals, e.g., I and Q output currents, for further processing.

Within the transmitter 1108, lowpass filters 1114(1), 1114 (2) filter the I and Q analog output signals, respectively, to remove undesired signals caused by the prior digital-to-analog conversion. Amplifiers (AMPs) 1116(1), 1116(2) amplify the signals from the lowpass filters 1114(1), 1114(2), respectively, and provide I and Q baseband signals. An upconverter 1118 upconverts the I and Q baseband signals with I and Q transmit (TX) local oscillator (LO) signals through mixers 1120(1), 1120(2) from a TX LO signal generator 1122 to provide an upconverted signal 1124. A filter 1126 filters the upconverted signal 1124 to remove undesired signals caused by the frequency upconversion as well as noise in a receive frequency band. A power amplifier (PA) 1128 amplifies the upconverted signal 1124 from the filter 1126 to obtain the desired output power level and provides a transmit RF signal. The transmit RF signal is routed through a duplexer or switch 1130 and transmitted via an antenna 1132.

In the receive path, the antenna 1132 receives signals transmitted by base stations and provides a received RF signal, which is routed through the duplexer or switch 1130 and provided to a low noise amplifier (LNA) 1134. The duplexer or switch 1130 is designed to operate with a specific receive (RX)-to-TX duplexer frequency separation, such that RX signals are isolated from TX signals. The received RF signal is amplified by the LNA 1134 and filtered by a filter 1136 to obtain a desired RF input signal. Down-conversion mixers 1138(1), 1138(2) mix the output of the filter 1136 with I and Q RX LO signals (i.e., LO_I and LO_Q) from an RX LO signal generator 1140 to generate I and Q baseband signals. The I and Q baseband signals are amplified by AMPs 1142(1), 1142(2) and further filtered by lowpass filters 1144(1), 1144(2) to obtain I and Q analog input signals, which are provided to the data processor 1106. In this example, the data processor 1106 includes analog-to-digital converters (ADCs) 1146(1), 1146(2) for converting the analog input signals into digital signals to be further processed by the data processor 1106.

In the wireless communications device 1100 of FIG. 11, the TX LO signal generator 1122 generates the I and Q TX LO signals used for frequency upconversion, while the RX LO signal generator 1140 generates the I and Q RX LO signals used for frequency downconversion. Each LO signal is a periodic signal with a particular fundamental frequency. A TX phase-locked loop (PLL) circuit 1148 receives timing information from the data processor 1106 and generates a control signal used to adjust the frequency and/or phase of the TX LO signals from the TX LO signal generator 1122. Similarly, an RX PLL circuit 1150 receives timing information from the data processor 1106 and generates a control signal used to adjust the frequency and/or phase of the RX LO signals from the RX LO signal generator 1140.

Figure 12:
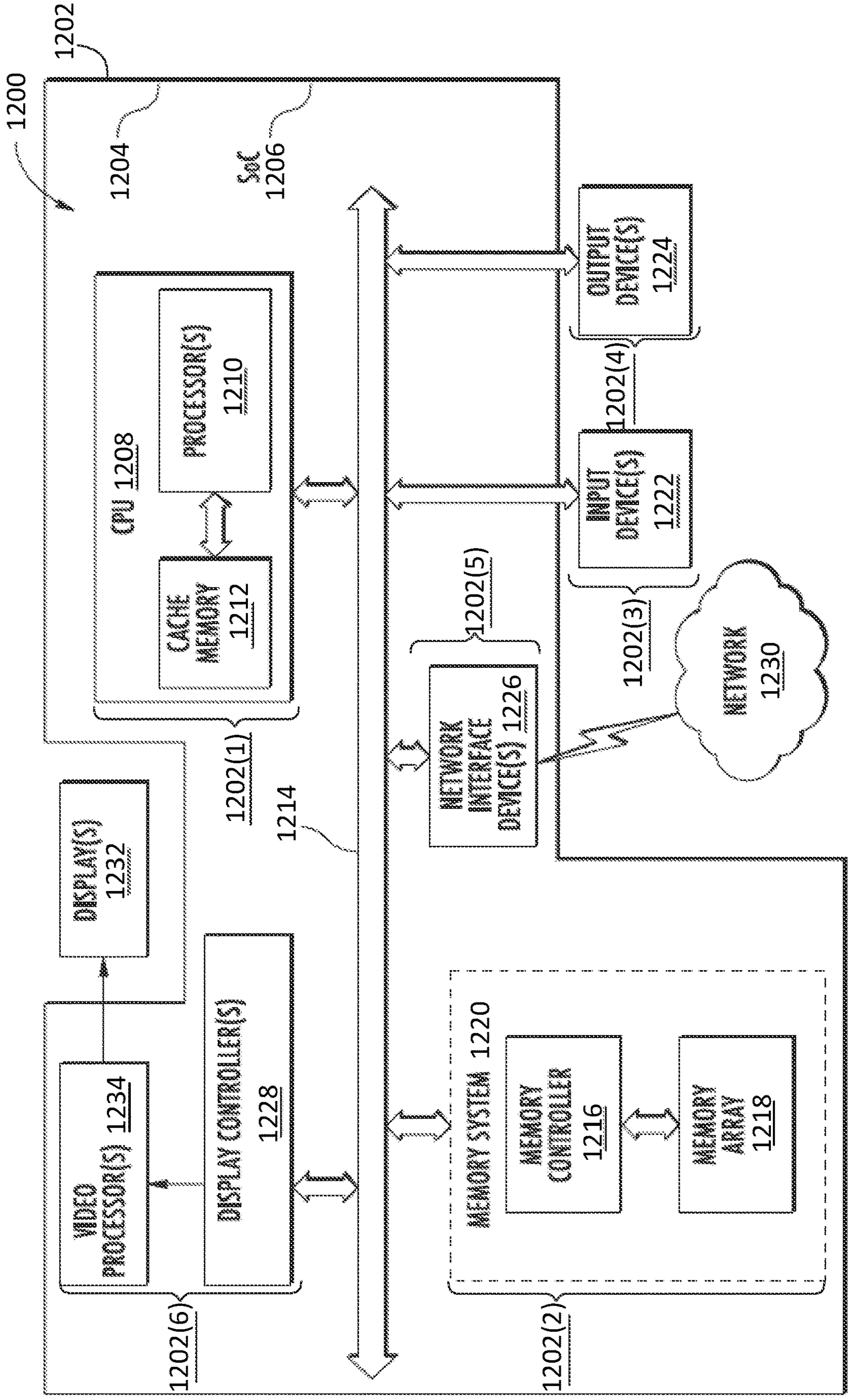
FIG. 12 is a block diagram of an exemplary processor-based system that includes a die that provides an antenna module, wherein the die includes a RF IC with a RF circuit, and an integrated antenna substrate to provide an antenna for the RF circuit, wherein the antenna substrate is adjacent to the back side of the RF IC, including, but not limited to, the dies in FIGS. 2A-5, 8F, and 10F, and that can be fabricated according to any of the exemplary fabrication processes in FIGS. 6, 7A-7E, and 9A-9E.

FIG. 12 illustrates an example of a processor-based system 1200 that can include an antenna module in the form of a die 1202, 1202(1)-1202(6). The die 1202, 1202(1)-1202(6) includes an RF IC with a RF circuit, and an integrated antenna substrate to provide an antenna for the RF circuit, wherein the antenna substrate is adjacent to the back side of the RF IC. The die 1202, 1202(1)-1202(6) can include the dies 200, 400, 500 in FIG. 2A-5, 8F, or 10F, and be fabricated according to any of the fabrication processes 600, 700, 900 in FIG. 6, 7A-7E, or 9A-9E, as non-limiting examples.

In this example, the processor-based system 1200 may be formed as a system-on-a-chip (SoC) 1206 that includes the die 1202. The processor-based system 1200 includes a CPU 1208 that includes one or more processors 1210, which may also be referred to as CPU cores or processor cores. The CPU 1208 may have cache memory 1212 coupled to the CPU 1208 for rapid access to temporarily stored data. The CPU 1208 is coupled to a system bus 1214 and can intercouple master and slave devices included in the processor-based system 1200. As is well known, the CPU 1208 communicates with these other devices by exchanging address, control, and data information over the system bus 1214. For example, the CPU 1208 can communicate bus transaction requests to a memory controller 1216 as an example of a slave device. Although not illustrated in FIG. 12, multiple system buses 1214 could be provided, wherein each system bus 1214 constitutes a different fabric. The CPU 1208 may contain the die 1202(1).

Other master and slave devices can be connected to the system bus 1214. As illustrated in FIG. 12, these devices can include a memory system 1220 (that may contain the die 1202(2)) that includes the memory controller 1216 and a memory array(s) 1218, one or more input devices 1222 (that may contain the die 1202(3)), one or more output devices 1224 (that may contain the die 1202(4)), one or more network interface devices 1226 (that may contain the die 1202(5)), and one or more display controllers 1228 (that may contain the die 1202(6)), as examples. Each of the memory systems 1220, the one or more input devices 1222, the one or more output devices 1224, the one or more network interface devices 1226, and the one or more display controllers 1228 can be provided in the same or different IC packages. The input device(s) 1222 can include any type of input device, including, but not limited to, input keys, switches, voice processors, etc. The output device(s) 1224 can include any type of output device, including, but not limited to, audio, video, other visual indicators, etc. The network interface device(s) 1226 can be any device configured to allow exchange of data to and from a network 1230. The network 1230 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1226 can be configured to support any type of communications protocol desired.

The CPU 1208 may also be configured to access the display controller(s) 1228 over the system bus 1214 to control information sent to one or more displays 1232. The display controller(s) 1228 sends information to the display (s) 1232 to be displayed via one or more video processors 1234, which processes the information to be displayed into a format suitable for the display(s) 1232. The display controller(s) 1228 and video processor(s) 1234 can be included in the same or different IC packages, and in the same or different IC packages containing the CPU 1208 as an example. The display(s) 1232 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A semiconductor die, comprising:
   - a semiconductor layer, comprising:
     - a first side;
     - a back side opposite the first side; and
     - a radio-frequency (RF) circuit;

a back-end-of-line (BEOL) interconnect structure coupled to the RF circuit, the BEOL interconnect structure comprising:

a front side; and a second side opposite the front side, the second side coupled to the first side of the semiconductor layer;

an antenna substrate adjacent to the back side of the semiconductor layer;

the antenna substrate comprising one or more antenna layers, a first antenna layer of the one or more antenna layers comprising one or more antenna elements; and one or more first vias each coupling an antenna element of the one or more antenna elements to the BEOL interconnect structure to couple the one or more antenna elements to the RF circuit.

2. The semiconductor die of clause 1, wherein the first antenna layer comprises a metal layer comprising one or more metal structures comprising the one or more antenna elements.

3. The semiconductor die of clause 2, wherein the first antenna layer has a line-spacing (L/S) metal pattern less than 3 μm.

4. The semiconductor die of any of clauses 1-3, wherein the first antenna layer comprises a first re-distribution layer (RDL).

5. The semiconductor die of any of clauses 1-3, wherein the one or more antenna layers each comprise a re-distribution layer (RDL).

6. The semiconductor die of any of clauses 1-5, wherein the one or more antenna elements comprise one or more metal patch antennas.

7. The semiconductor die of any of clauses 1-6, wherein each dimension of the one or more antenna elements is less than or equal to 500 micrometers (μm).

8 The semiconductor die of any of clauses 1-7, wherein the one or more antenna elements each support a wavelength less than or equal to one (1) millimeter (mm).

9. The semiconductor die of any of clauses 1-8, wherein the one or more antenna elements each support at least one communication frequency between 110 and 170 GigaHertz (GHz).

10. The semiconductor die of any of clauses 1-9, further comprising a dielectric material substrate between the back side of the semiconductor layer and the antenna substrate.

11. The semiconductor die of clause 10, further comprising an etch stop layer between the dielectric material substrate and the semiconductor layer.

12. The semiconductor die of clause 10 or 11, wherein the dielectric material substrate comprises a silicon substrate.

13. The semiconductor die of clause 12, wherein the silicon substrate comprises a porous silicon substrate.

14. The semiconductor die of any of clauses 10-13, wherein the dielectric material substrate has a permittivity between 4 farads per meter (F/m) and 6 F/m.

15. The semiconductor die of any of clauses 10-14, wherein the dielectric material substrate has a permittivity less than or equal to 5.0 farads per meter (F/m).

16. The semiconductor die of any of clauses 10-15, wherein the dielectric material substrate has a first thickness between the antenna substrate and the semiconductor layer between 40 and 60 micrometers (μm).

17. The semiconductor die of any of clauses 1-16, wherein the one or more antenna elements are each disposed a first distance from the RF circuit of between seventy (70) and eighty (80) micrometers (μm).

18. The semiconductor die of any of clauses 1-17, further comprising an integrated circuit (IC) comprising the semiconductor layer and the BEOL interconnect structure;

wherein the IC comprises a bulk device, wherein the semiconductor layer comprises a bulk semiconductor material layer.

19. The semiconductor die of any of clauses 1-17, further comprising:

an integrated circuit (IC) comprising a silicon-on-insulator (SOI) device comprising the semiconductor layer and the BEO interconnect structure;

wherein the semiconductor layer comprises a buried oxide (BOX) layer adjacent to the front side and a semiconductor substrate adjacent to the back side, such that the BOX layer is between the front side and the semiconductor substrate.

20. The semiconductor die of any of clauses 1-19, wherein:

the BEOL interconnect structure comprises a plurality of metal layers between the front side and the second side, the plurality of metal layers each comprising one or more metal interconnects; and the one or more first vias each couple an antenna element of the one or more antenna elements to the one or more metal interconnects in a first metal layer of the plurality of metal layers; and further comprising:

one or more second vias each coupled to the RF circuit and each coupled to the one or more metal interconnects in the first metal layer of the plurality of metal layers.

21. The semiconductor die of any of clauses 1-20, wherein the one or more first vias comprise one or more first through-silicon-vias (TSVs).

22. The semiconductor die of any of clauses 1-21 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SiP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

23. A method of fabricating a semiconductor die, comprising:

forming a semiconductor layer, comprising:

a first side;

a back side opposite the first side; and a radio-frequency (RF) circuit;

forming a back-end-of-line (BEOL) interconnect structure coupled to the RF circuit, the BEOL interconnect structure comprising:

a front side; and
a second side opposite the front side, the second side coupled to the semiconductor layer;
forming an antenna substrate adjacent to the back side of the semiconductor layer, comprising:
forming one or more antenna layers, wherein a first antenna layer of the one or more antenna layers comprises one or more antenna elements; and
forming one or more first vias each coupling an antenna element of the one or more antenna elements to the BEOL interconnect structure to couple the one or more antenna elements to the RF circuit.

24. The method of clause 23, wherein forming the one or more antenna layers comprises forming the first antenna layer comprising forming a metal layer comprising one or more metal structures comprising the one or more antenna elements in the first antenna layer.

25. The method of clause 23 or 24, wherein forming the metal layer comprises forming a first re-distribution layer (RDL).

26. The method of any of clauses 23-25, further comprising forming a dielectric material substrate adjacent to the back side of the semiconductor layer; and wherein forming the antenna substrate further comprises forming the antenna substrate on the dielectric material substrate.

27 The method of clause 23-25, further comprising:
forming a dielectric material substrate adjacent to the back side of the semiconductor layer; and
forming an etch stop layer on the dielectric material substrate;
wherein forming the antenna substrate further comprises forming the antenna substrate adjacent to the etch stop layer.

28. The method of clause 26 or 27, wherein forming the dielectric material substrate further comprises:
forming a silicon substrate adjacent to the back side of the semiconductor layer; and
porsifying the silicon substrate to form a porous silicon substrate adjacent to the back side of the semiconductor layer.

29. The method of any of clauses 23-28, wherein forming the BEOL interconnect structure further comprises forming a plurality of metal layers between the front side and the second side, the plurality of metal layers each comprising one or more metal interconnects; and further comprising forming the one or more first vias in the antenna substrate and the BEOL interconnect structure each coupling an antenna element of the one or more antenna elements to the one or more metal interconnects in a first metal layer of the plurality of metal layers.

30. The method of clause 29, further comprising forming one or more second vias each coupled to the RF circuit and each coupled to the one or more metal interconnects in the first metal layer of the plurality of metal layers.

31. The method of clause 29 or 30, wherein forming the one or more first vias comprises forming one or more first through-silicon-vias (TSVs) in the antenna substrate and the BEOL interconnect structure each coupling an antenna element of the one or more antenna elements to the one or more metal interconnects in the first metal layer of the plurality of metal layers.

32. The method of any of clauses 26-31, further comprising grinding down the dielectric material substrate to a desired first thickness to control a distance between the one or more antenna elements and the RF circuit.

33. The method of any of clauses 26-32, wherein forming the semiconductor layer further comprises:
forming a semiconductor substrate on the dielectric material substrate, the semiconductor substrate comprising the back side; and
forming a buried oxide (BOX) layer on the semiconductor substrate;
wherein:
forming the BEOL interconnect structure further comprises forming the BEOL interconnect structure adjacent to the BOX layer.

34. The method of any of clauses 26-32, wherein forming the semiconductor layer further comprises forming a silicon layer on the dielectric material substrate, the silicon layer comprising the first side and the back side; and
wherein:
forming the BEOL interconnect structure further comprises forming the BEOL interconnect structure adjacent to the silicon layer.

What is claimed is:

1. An electronic device, comprising:
a comprising:
a semiconductor layer, comprising:
a first side;
a back side opposite the first side; and
a radio-frequency (RF) circuit; and
a back-end-of-line (BEOL) interconnect structure coupled to the RF circuit, the BEOL interconnect structure comprising:
a front side; and
a second side opposite the front side, the second side coupled to the first side of the semiconductor layer;
an antenna substrate integrated in the semiconductor die, the antenna substrate adjacent to the back side of the semiconductor layer;
the antenna substrate comprising one or more antenna layers, a first antenna layer of the one or more antenna layers comprising one or more antenna elements; and
one or more first vias each coupling an antenna element of the one or more antenna elements to the BEOL interconnect structure to couple the one or more antenna elements to the RF circuit.

2. The electronic device of claim 1, wherein the first antenna layer comprises a metal layer comprising one or more metal structures comprising the one or more antenna elements.

3. The electronic device of claim 2, wherein the first antenna layer has a line-spacing (L/S) metal pattern less than 3 μm.

4. The electronic device of claim 1, wherein the first antenna layer comprises a first re-distribution layer (RDL).

5. The electronic device of claim 1, wherein the one or more antenna layers each comprise a re-distribution layer (RDL).

6. The electronic device of claim 1, wherein the one or more antenna elements comprise one or more metal patch antennas.

7. The electronic device of claim 1, wherein each dimension of the one or more antenna elements is less than or equal to 500 micrometers (μm).

8. The electronic device of claim 1, wherein the one or more antenna elements each support a wavelength less than or equal to one (1) millimeter (mm).

9. The electronic device of claim 1, wherein the one or more antenna elements each support at least one communication frequency between 110 and 170 GigaHertz (GHz).

10. The electronic device of claim 1, further comprising a dielectric material substrate between the back side of the semiconductor layer and the antenna substrate.

11. The electronic device of claim 10, further comprising an etch stop layer between the dielectric material substrate and the semiconductor layer.

12. The electronic device of claim 10, wherein the dielectric material substrate comprises a silicon substrate.

13. The electronic device of claim 12, wherein the silicon substrate comprises a porous silicon substrate.

14. The electronic device of claim 10, wherein the dielectric material substrate has a permittivity between 4 farads per meter (F/m) and 6 F/m.

15. The electronic device of claim 10, wherein the dielectric material substrate has a permittivity less than or equal to 5.0 farads per meter (F/m).

16. The electronic device of claim 10, wherein the dielectric material substrate has a first thickness between the antenna substrate and the semiconductor layer between 40 and 60 micrometers (μm).

17. The electronic device of claim 1, wherein the one or more antenna elements are each disposed a first distance from the RF circuit of between seventy (70) and eighty (80) micrometers (μm).

18. The electronic device of claim 1, further comprising an integrated circuit (IC) comprising the semiconductor layer and the BEOL interconnect structure;
wherein the IC comprises a bulk device, wherein the semiconductor layer comprises a bulk semiconductor material layer.

19. The electronic device of claim 1, further comprising:
an integrated circuit (IC) comprising a silicon-on-insulator (SOI) device comprising the semiconductor layer and the BEOL interconnect structure;
wherein the semiconductor layer comprises a buried oxide (BOX) layer adjacent to the front side and a semiconductor substrate adjacent to the back side, such that the BOX layer is between the front side and the semiconductor substrate.

20. The electronic device of claim 1, wherein:
the BEOL interconnect structure comprises a plurality of metal layers between the front side and the second side, the plurality of metal layers each comprising one or more metal interconnects; and
the one or more first vias each couple an antenna element of the one or more antenna elements to the one or more metal interconnects in a first metal layer of the plurality of metal layers; and
further comprising:
one or more second vias each coupled to the RF circuit and each coupled to the one or more metal interconnects in the first metal layer of the plurality of metal layers.

21. The electronic device of claim 1, wherein the one or more first vias comprise one or more first through-silicon-vias (TSVs).

22. The electronic device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SiP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

23. A method of fabricating an electronic device, comprising:
fabricating a comprising:
forming a semiconductor layer, comprising:
a first side;
a back side opposite the first side; and
a radio-frequency (RF) circuit;
forming a back-end-of-line (BEOL) interconnect structure coupled to the RF circuit, the BEOL interconnect structure comprising:
a front side; and
a second side opposite the front side, the second side coupled to the semiconductor layer;
forming an antenna substrate integrated into the semiconductor die and adjacent to the back side of the semiconductor layer, comprising:
forming one or more antenna layers, wherein a first antenna layer of the one or more antenna layers comprises one or more antenna elements; and
forming one or more first vias each coupling an antenna element of the one or more antenna elements to the BEOL interconnect structure to couple the one or more antenna elements to the RF circuit.

24. The method of claim 23, wherein forming the one or more antenna layers comprises forming the first antenna layer comprising forming a metal layer comprising one or more metal structures comprising the one or more antenna elements in the first antenna layer.

25. The method of claim 24, wherein forming the metal layer comprises forming a first re-distribution layer (RDL).

26. The method of claim 23, further comprising forming a dielectric material substrate adjacent to the back side of the semiconductor layer; and
wherein forming the antenna substrate further comprises forming the antenna substrate on the dielectric material substrate.

27. The method of claim 23, further comprising:
forming a dielectric material substrate adjacent to the back side of the semiconductor layer; and
forming an etch stop layer on the dielectric material substrate;
wherein forming the antenna substrate further comprises forming the antenna substrate adjacent to the etch stop layer.

28. The method of claim 26, wherein forming the dielectric material substrate further comprises:
forming a silicon substrate adjacent to the back side of the semiconductor layer; and
porosifying the silicon substrate to form a porous silicon substrate adjacent to the back side of the semiconductor layer.

29. The method of claim 23, wherein forming the BEOL interconnect structure further comprises forming a plurality of metal layers between the front side and the second side, the plurality of metal layers each comprising one or more metal interconnects; and further comprising forming the one or more first vias in the antenna substrate and the BEOL interconnect structure each coupling an antenna element of the one or more antenna elements to the one or more metal interconnects in a first metal layer of the plurality of metal layers.

30. The method of claim 29, further comprising forming one or more second vias each coupled to the RF circuit and each coupled to the one or more metal interconnects in the first metal layer of the plurality of metal layers.

31. The method of claim 29, wherein forming the one or more first vias comprises forming one or more first through-silicon-vias (TSVs) in the antenna substrate and the BEOL interconnect structure each coupling an antenna element of the one or more antenna elements to the one or more metal interconnects in the first metal layer of the plurality of metal layers.

32. The method of claim 26, further comprising grinding down the dielectric material substrate to a desired first thickness to control a distance between the one or more antenna elements and the RF circuit.

33. The method of claim 26, wherein forming the semiconductor layer further comprises:

forming a semiconductor substrate on the dielectric material substrate, the semiconductor substrate comprising the back side; and forming a buried oxide (BOX) layer on the semiconductor substrate;

wherein:

forming the BEOL interconnect structure further comprises forming the BEOL interconnect structure adjacent to the BOX layer.

34. The method of claim 26, wherein forming the semiconductor layer further comprises forming a silicon layer on the dielectric material substrate, the silicon layer comprising the first side and the back side; and wherein:

forming the BEOL interconnect structure further comprises forming the BEOL interconnect structure adjacent to the silicon layer.

35. The electronic device of claim 1, not comprising bump structures between the antenna substrate to back side of the semiconductor layer.

36. The electronic device of claim 1, further comprising an integrated circuit (IC) chip comprising the semiconductor die, and wherein the antenna substrate is integrated in the IC chip.

37. The method of claim 23, wherein forming the antenna substrate adjacent to the back side of the semiconductor layer further comprises not forming bump structures between the antenna substrate and the back side of the semiconductor layer.

38. The method of claim 23, wherein:

forming the die further comprises forming an integrated circuit (IC) chip comprising the semiconductor layer and the BEOL interconnect structure; and forming the antenna substrate further comprises integrating the antenna substrate in the IC chip.

* * * * *